United States Patent
Wang et al.

(10) Patent No.: US 9,960,443 B2
(45) Date of Patent: *May 1, 2018

(54) REDOX FLOW BATTERIES HAVING MULTIPLE ELECTROACTIVE ELEMENTS

(75) Inventors: Wei Wang, Kennewick, WA (US); Liyu Li, Richland, WA (US); Zhenguo Yang, Richland, WA (US); Zimin Nie, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/246,444

(22) Filed: Sep. 27, 2011

(65) Prior Publication Data

US 2012/0077068 A1 Mar. 29, 2012

Related U.S. Application Data

(63) Continuation-in-part of application No. 12/892,698, filed on Sep. 28, 2010.

(51) Int. Cl.
*H01M 8/18* (2006.01)
*H01M 8/20* (2006.01)
*H01M 2/16* (2006.01)

(52) U.S. Cl.
CPC .......... *H01M 8/188* (2013.01); *H01M 8/20* (2013.01); *H01M 2/1653* (2013.01); *Y02E 60/528* (2013.01)

(58) Field of Classification Search
CPC ...... H01M 8/188; H01M 8/20; H01M 2/1653; H01M 2300/011

USPC .................................................. 429/101–109
See application file for complete search history.

(56) References Cited

U.S. PATENT DOCUMENTS

| 3,540,933 | A | * | 11/1970 | Boeke | 429/417 |
| 3,996,064 | A | | 12/1976 | Thaller | |
| 4,469,760 | A | | 9/1984 | Giner et al. | |
| 4,786,567 | A | | 11/1988 | Skyllas-Kazacos et al. | |
| 4,814,241 | A | | 3/1989 | Nagashima et al. | |
| 6,562,514 | B1 | * | 5/2003 | Kazacos et al. | 429/204 |
| 6,872,376 | B2 | | 3/2005 | Tanaka et al. | |
| 7,078,123 | B2 | | 7/2006 | Kazacos et al. | |

(Continued)

FOREIGN PATENT DOCUMENTS

| CN | 1768442 | 5/2006 |
| CN | 1770503 | 5/2006 |

(Continued)

OTHER PUBLICATIONS

Machine translation of "Kaneko" JP-04019966.*

(Continued)

*Primary Examiner* — Stephen J Yanchuk
(74) *Attorney, Agent, or Firm* — Klarquist Sparkman, LLP

(57) ABSTRACT

Introducing multiple redox reactions with a suitable voltage range can improve the energy density of redox flow battery (RFB) systems. One example includes RFB systems utilizing multiple redox pairs in the positive half cell, the negative half cell, or in both. Such RFB systems can have a negative electrolyte, a positive electrolyte, and a membrane between the negative electrolyte and the positive electrolyte, in which at least two electrochemically active elements exist in the negative electrolyte, the positive electrolyte, or both.

15 Claims, 15 Drawing Sheets

(56) References Cited

U.S. PATENT DOCUMENTS

| | | | |
|---|---|---|---|
| 7,320,844 | B2 | 1/2008 | Skyllas-Kazacos |
| 8,628,880 | B2 | 1/2014 | Li et al. |
| 8,771,856 | B2 | 7/2014 | Li et al. |
| 9,077,011 | B2 | 7/2015 | Li et al. |
| 9,123,931 | B2 | 9/2015 | Li et al. |
| 2003/0143456 | A1 | 7/2003 | Kazacos |
| 2005/0244707 | A1 | 11/2005 | Skyllas-Kazacos et al. |
| 2006/0183016 | A1 | 8/2006 | Kazacos et al. |
| 2008/0292964 | A1 | 11/2008 | Kazacos et al. |
| 2010/0230632 | A1 | 9/2010 | Adamson et al. |
| 2010/0291420 | A1 | 11/2010 | Kazacos et al. |
| 2011/0027629 | A1* | 2/2011 | Deane ............... B60L 11/1879 429/50 |
| 2011/0045332 | A1* | 2/2011 | Horne et al. ................. 429/105 |
| 2011/0086247 | A1 | 4/2011 | Keshavarz et al. |
| 2012/0040216 | A1 | 2/2012 | Parakulam |
| 2012/0052347 | A1* | 3/2012 | Wilson et al. ................. 429/72 |
| 2012/0115069 | A1* | 5/2012 | Noack et al. ................. 429/498 |
| 2014/0199607 | A1 | 7/2014 | Li et al. |
| 2014/0234753 | A1 | 8/2014 | Li et al. |
| 2015/0221969 | A1 | 8/2015 | Sekine et al. |
| 2015/0380757 | A1 | 12/2015 | Li et al. |

FOREIGN PATENT DOCUMENTS

| | | | |
|---|---|---|---|
| EP | 0729648 | | 4/2003 |
| JP | 04019966 | * | 5/1990 |
| JP | 2010-086935 | | 4/2010 |
| WO | 9512219 | A1 | 5/1995 |
| WO | 9635239 | A1 | 11/1996 |
| WO | WO02/095855 | | 11/2002 |
| WO | WO2004/082056 | | 9/2004 |
| WO | WO2008/148148 | | 12/2008 |
| WO | WO2010/094657 | * | 9/2010 |

OTHER PUBLICATIONS

STN Search.*
STIC Search.*
Skyllas-Kazacos, Maria, "Novel vanadium chloride/polyhalide redox flow battery", Journal of Power Sources, 2003, 299-302 pps., vol. 124, Elsevier, Sydney, Australia.
International Search Report for PCT/US2011/039624 (Mar. 23, 2012).
STN Search U.S. Appl. No. 12/892,698 (dated May 24, 2013).
Adam, J., "Vanadium Chloride Battery," Thesis, pp. 1-78, School of Chemical Engineering, The University of New South Wales (Oct. 2008).
Li, L. et al., "A stable vanadium redox-flow battery with high energy density for large-scale energy storage," *Advanced Energy Materials*, vol. 1, No. 3 pp. 394-400 (May 2011).
Notice of Non-Final Rejection from the Korean Intellectual Property Office for Korean Patent Application No. 10-2013-7010271, dated Sep. 26, 2014.
Office Action from Chinese Patent Office for Chinese Patent Application No. 201180046489.0, dated Oct. 24, 2014.
Office Action from U.S. Patent and Trademark Office for U.S. Appl. No. 14/105,823, dated Apr. 25, 2014.
Office Action from U.S. Patent and Trademark Office for U.S. Appl. No. 14/261,262, dated Jul. 10, 2014.
Skyllas-Kazacos, M., et al., "Progress in Flow Battery Research and Development," Critical Reviews in Electrochemical and Solid-State Science and Technology, pp. R55-R79, vol. 158, *Journal of the Electrochemical Society*, Karachi, Pakistan (Jun. 2011).
Sum, E. et al., "Investigation of the V(V)/V(IV) System for Use in the Positive Half-Cell of a Redox Battery," *Journal of Power Sources*, vol. 16, pp. 85-95 (Jul. 1985).
Sum, E. et al., "A study of the V(II)/V(III) Redox Couple for Redox Flow Cell Applications," *Journal of Power Sources*, vol. 15, No. 2/03, pp. 179-190 (Jun. 1985).
Wang, W. et al., "A new redox flow battery using Fe-V redox couples in chloride supporting electrolyte," *Energy & Environmental Science*, vol. 4, No. 10, pp. 4068-4073 (Aug. 2011).
Li, L. et al., "Development of High Performance Redox Flow Batteries at PNNL," 16 pages, DOE OE Program Review, San Diego, CA (Oct. 21, 2011).
Zhang, J. et al., "Effects of additives on the stability of electrolytes for all-vanadium redox flow batteries," *J. Appl. Electrochem.*, vol. 41, Issue 10, pp. 1215-1221 (Oct. 2011).
International Search Report and Written Opinion for PCT/US2015/054075, dated Dec. 21, 2015, 8 pages.
Office Action from Japanese Patent Office for Japanese Patent Application No. 2013-830141, dated Mar. 29, 2016.
Office Action from Canadian Intellectual Property Office for Canadian Patent Application No. 2,812,932, dated Mar. 6, 2017.

* cited by examiner

- ■ Capacity: 2.3 MV in 10 M total chloride
- ● Capacity: 1.7 MV ub 5 M total sulphate
- ■ Energy Density: 2.3 MV in 10 M total chloride
- ● Energy Density: 1.7 MV in 5 M total sulphate

REDOX FLOW BATTERIES HAVING MULTIPLE ELECTROACTIVE ELEMENTS

CROSS-REFERENCE TO RELATED APPLICATIONS

This application is a continuation-in-part of U.S. application Ser. No. 12/892,698 filed on Sep. 28, 2010, the disclosure of which is incorporated fully herein by reference.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

A redox flow battery (RFB) stores electrical energy in reduced and oxidized species dissolved in two separate electrolyte solutions. The negative electrolyte and the positive electrolyte circulate through two cell electrodes separated by an ion conducting membrane or separator. Redox flow batteries are advantageous for energy storage because they are capable of tolerating fluctuating power supplies, repetitive charge/discharge cycles at maximum rates, overcharging, overdischarging, and because cycling can be initiated at any state of charge.

However, among the many redox couples upon which redox flow batteries are based, a number of disadvantages exist. For example, many systems utilize redox species that are unstable, are highly oxidative, are difficult to reduce or oxidize, precipitate out of solution, and/or generate volatile gases. One of the main challenges confronting RFB systems is the intrinsically low energy density compared with other reversible energy storage systems such as lithium-ion batteries. With the voltage limitation of the aqueous systems, this issue is typically tackled by increasing the active species concentration in the electrolyte. However, the active species concentration is limited by the solubility and the stability of the active redox ions in the electrolyte solutions. Therefore, a need exists for RFB systems having a greater energy density.

SUMMARY

The present invention includes redox flow battery (RFB) systems having a negative electrolyte, a positive electrolyte, and a membrane between the positive and negative electrolytes. The systems comprise at least two electrochemically active redox elements in the negative electrolyte, the positive electrolyte, or both. Accordingly, the RFB systems embodied by the present invention employ at least two active redox pairs in the negative half cell, the positive half cell, or both half cells.

As used herein, a RFB system comprises a positive half cell and a negative half cell. The half cells are separated by an ion-conductive membrane or separator. The positive half cell contains a positive electrolyte and the negative half cell contains a negative electrolyte. The positive electrolyte and negative electrolyte are solutions comprising electrochemically active elements in different oxidation states. The electrochemically active elements in the positive electrolyte and the negative electrolyte couple as redox pairs. The positive electrolyte/negative electrolyte are continuously circulating through the positive/negative electrodes, respectively, where the redox reactions proceed providing the conversion between electrochemical energy and electrical energy or vice-versa. Positive and negative electrodes are electrically connected through current collectors with the external load to finish the circuit.

In a preferred embodiment, the positive electrolyte comprises $V^{4+}$ and $V^{5+}$ as well as $Fe^{2+}$ and $Fe^{3+}$, and the negative electrolyte comprises $V^{2+}$ and $V^{3+}$. When a plurality of electroactive elements exists in one half cell and fewer electroactive elements exist in the other half cell, the relative volumes of the negative electrolyte and positive electrolyte should be selected to appropriately balance the electrochemical reactions. For example, in the instant embodiment, the negative electrolyte volume, which contains the common $V^{2+}$ and $V^{3+}$ species, should be approximately twice that of the positive electrolyte, which contains $V^{4+}$ and $V^{5+}$ as well as $Fe^{2+}$ and $Fe^{3+}$. Preferably, the total concentrations of each of the $V^{4+}/V^{5+}$, $Fe^{2+}/Fe^{3+}$, $V^{2+}/V^{3+}$ is greater than 1 M. The negative electrolyte and positive electrolyte aqueous solutions can comprise $Cl^-$, $SO_4^{2-}$, or both. When the solutions comprise a mixture of $Cl^-$ and $SO_4^{2-}$, the concentration ratio can be between 1:10 and 10:1. Preferably the ratio is between 1:3 and 3:1.

In other embodiments, the negative electrolyte and positive electrolyte can comprise $Cr^{2+}$, $Cr^{3+}$, or both. For example, the positive electrolyte can comprise $V^{4+}$ and $V^{5+}$, while the negative electrolyte comprises $Cr^{2+}$ and $Cr^{3+}$ as well as $V^{2+}$ and $V^{3+}$. Alternatively, the negative electrolyte can comprise Zn and the positive electrolyte can comprise one or more halogens. In still other embodiments, the negative electrolyte and positive electrolyte can comprise organic, rather than aqueous, solutions.

The RFB systems of the present invention can further comprise electrodes in contact with the electrolyte solutions as well as a redox catalyst in the negative electrolyte and/or the positive electrolyte to improve the kinetics of the reduction and/or oxidation reactions.

In some embodiments, the cell temperature of the RFB system is less than 60° C. during operation without an external temperature control device. Preferably, the temperature is between −20° C. and 50° C.

In a preferred embodiment, a RFB battery system has a membrane separating a negative electrolyte and a positive electrolyte and employs at least two active redox pairs in the RFB positive half cell. The positive electrolyte comprises $V^{4+}$ and $V^{5+}$ as well as $Fe^{2+}$ and $Fe^{3+}$. The negative electrolyte comprises $V^{2+}$ and $V^{3+}$, and the volume of the negative electrolyte is approximately twice that of the positive electrolyte. The negative electrolyte also comprises $Fe^{2+}$, but it is not active. The negative electrolyte and positive electrolyte are aqueous solutions comprising $Cl^-$, $SO_4^{2-}$, or a mixture of both.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

Figure 1:
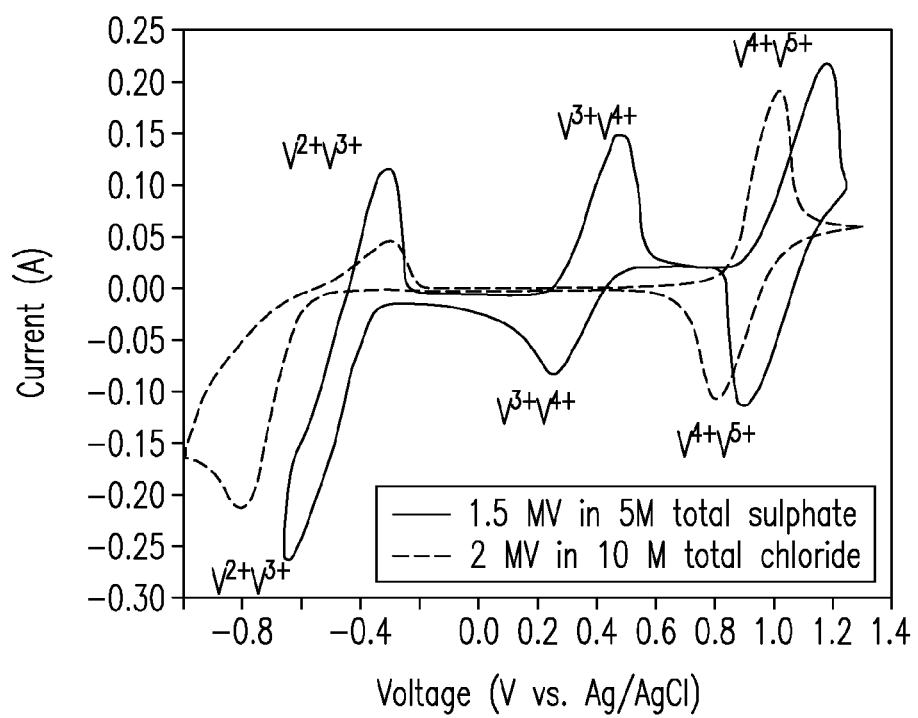
FIG. 1 is a graph of current versus voltage comparing all-vanadium RFBs using chloride-containing and sulfate-containing supporting solutions.

The following description includes the preferred best mode as well as other embodiments of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Meeting all of the performance and cost-requirement matrices for broad market penetration have been challenges for RFB technologies. One of the main problems facing current RFBs is the intrinsically low energy density compared with other reversible energy storage systems such as lithium-ion batteries. With the voltage limitation of the aqueous systems, this problem has historically been approached by increasing the active species concentration in the electrolyte. However, solubility and stability issues limit the maximum concentration of the active redox ions in the electrolyte solutions.

Multi-electron materials and processes can be utilized to meet the need for high energy and high power density. In an aqueous RFB system, multiple electron transfer from single element is probably difficult to realize due to the narrow voltage window limited by the water electrolysis. However, it is possible to employ multiple electrons from different elements. The energy density (based on electrolyte only) of a RFB utilizing multiple electrons thus can be expressed as in the equation 1.

$$E_d = \frac{\sum C_i V_c F E_i^o}{V} \qquad \text{Equation 1}$$

In equation 1, energy density $E_d$ is expressed in unit volume V (including both positive electrolyte and negative electrolyte), where $C_i$ is the concentration of each active redox species and $E_i^o$ is the voltage of each redox reaction, F is the Faraday constant, and $V_c$ is the positive electrolyte volume (using negative electrolyte volume would yield the same result). Based on equation 1, more electron transfer results conspicuously in a higher energy density. Accordingly, introducing multiple redox reactions with suitable voltage range can improve the energy density of RFB systems. Embodiments of the present invention encompass RFB systems utilizing multiple redox pairs in the positive half cell, the negative half cell, or in both. In one particular example, an RFB system can use both $V^{4+}/V^{5+}$ vs. $V^{2+}/V^{3+}$ and $Fe^{2+}/Fe^{3+}$ redox couples. All-vanadium RFB systems and Fe/V RFB systems have each been previously described in detail (see U.S. patent application Ser. Nos. 12/892,698 and 12/892,693 filed on Sep. 28, 2010), which details are also included below.

Figure 6A:
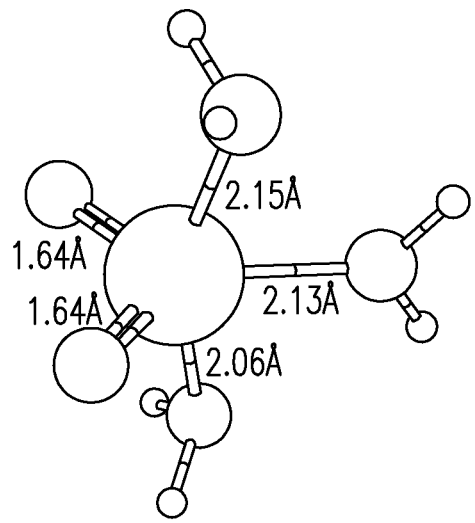
FIG. 6 is a diagram depicting structures of $VO_2^-$ in sulfuric acid (a) and in hydrochloric acid (b).
Figure 6B:
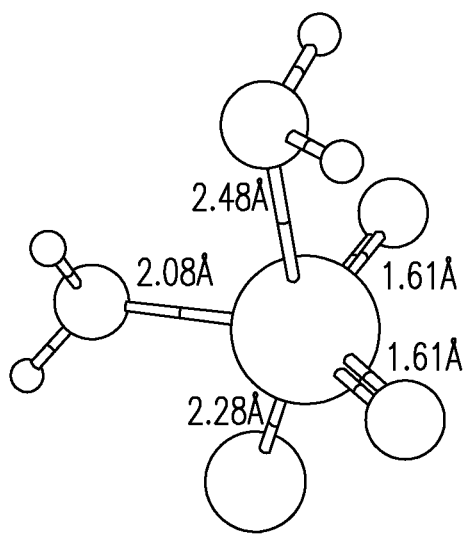
Figure 7:
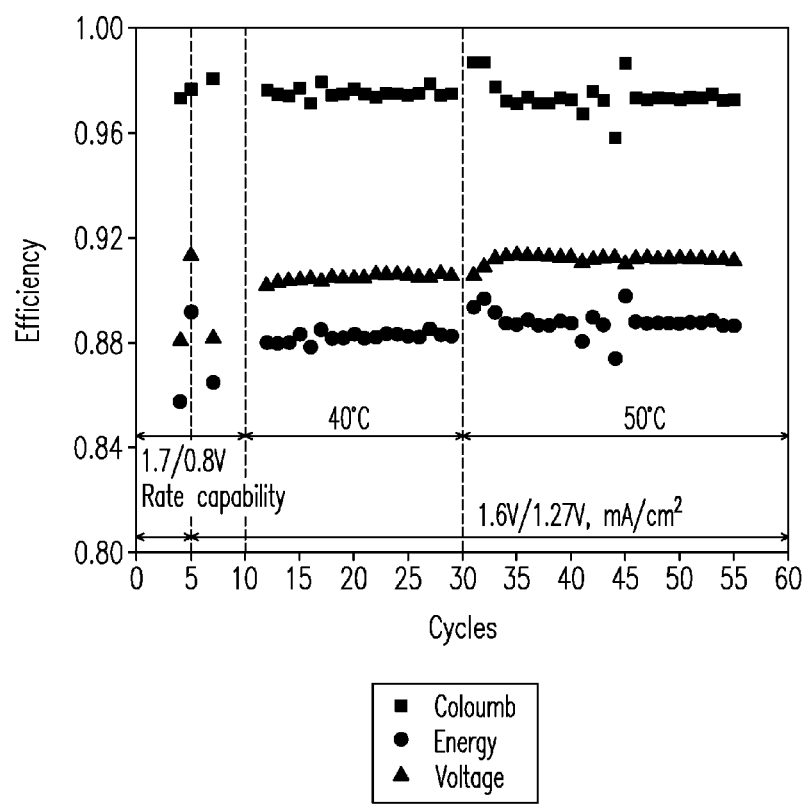
FIG. 7 is a graph of cyclic coulombic efficiency, voltage efficiency, and energy efficiency for a vanadium-chloride-sulfate RFB system.
Figure 8A:
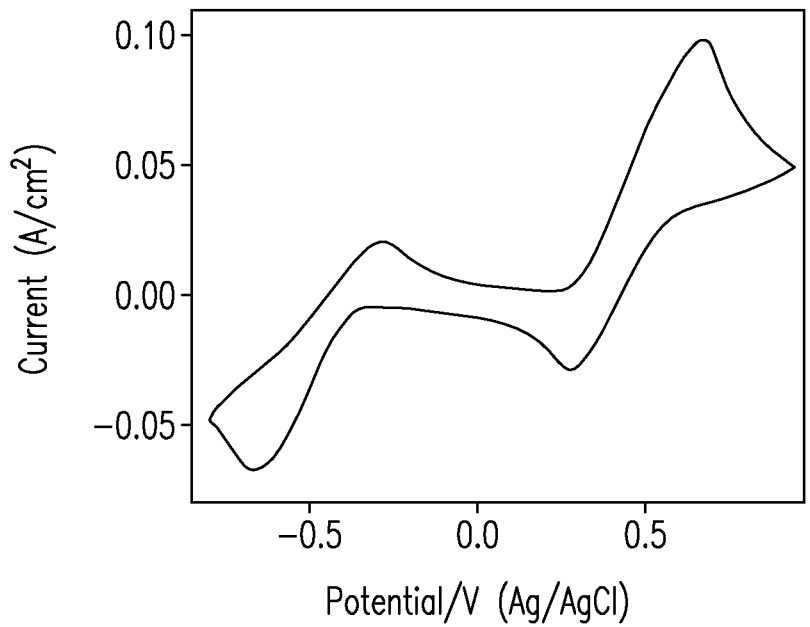
FIG. 8 are cyclic voltammetry curves in a Fe/V and Cl-containing solution using two different electrodes.
Figure 8B:
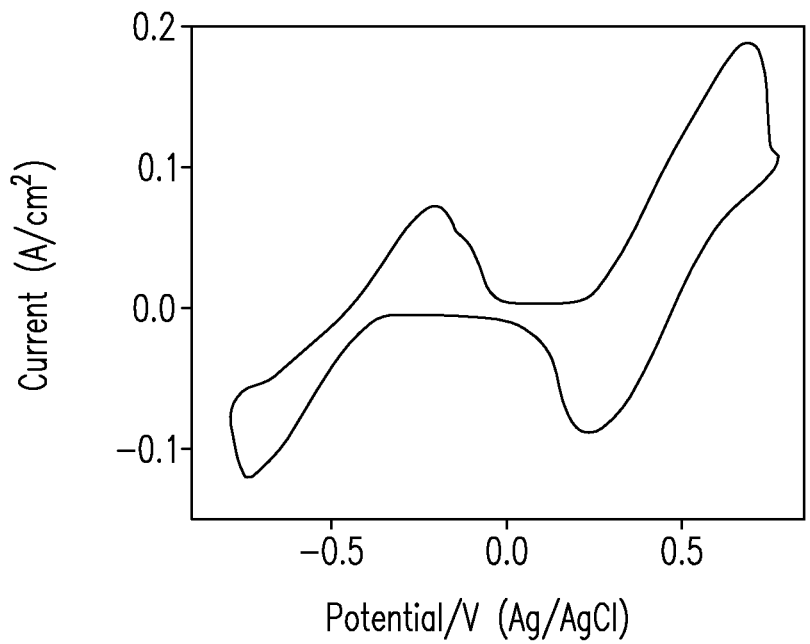
Figure 9A:
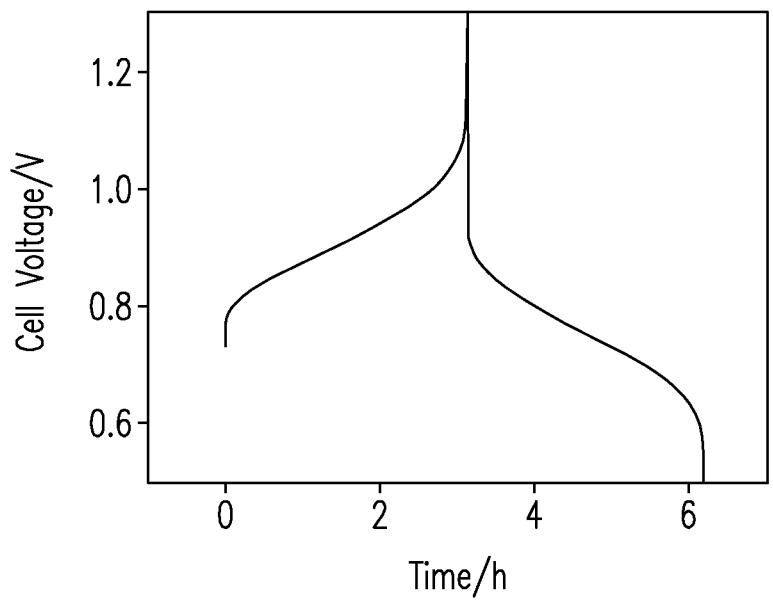
FIG. 9 contains graphs demonstrating the electrochemical performance of an Fe/V redox flow cell using a Cl-containing supporting solution.
Figure 9B:
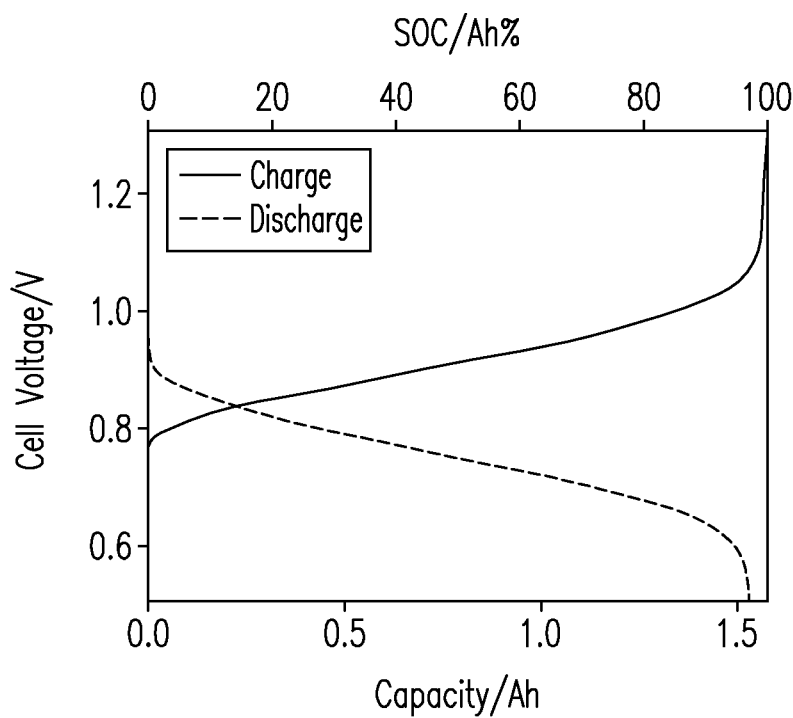
Figure 9C:
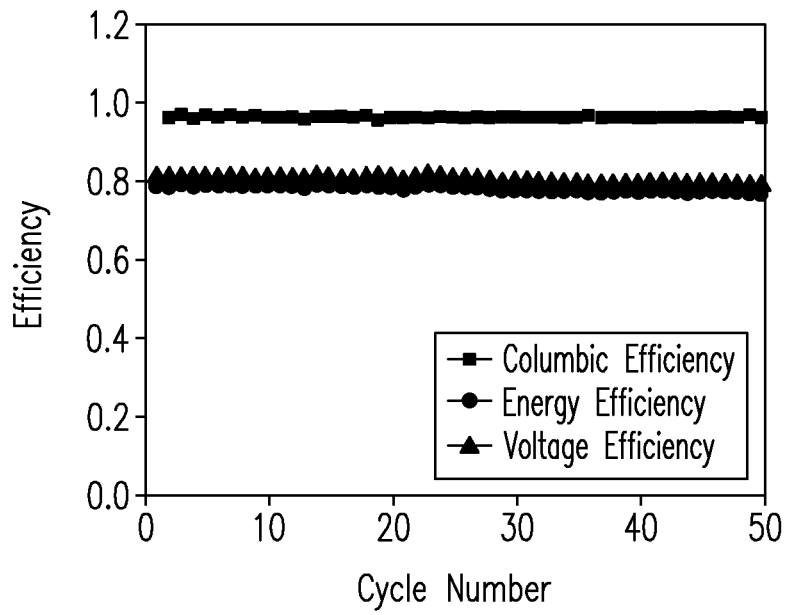
Figure 9D:
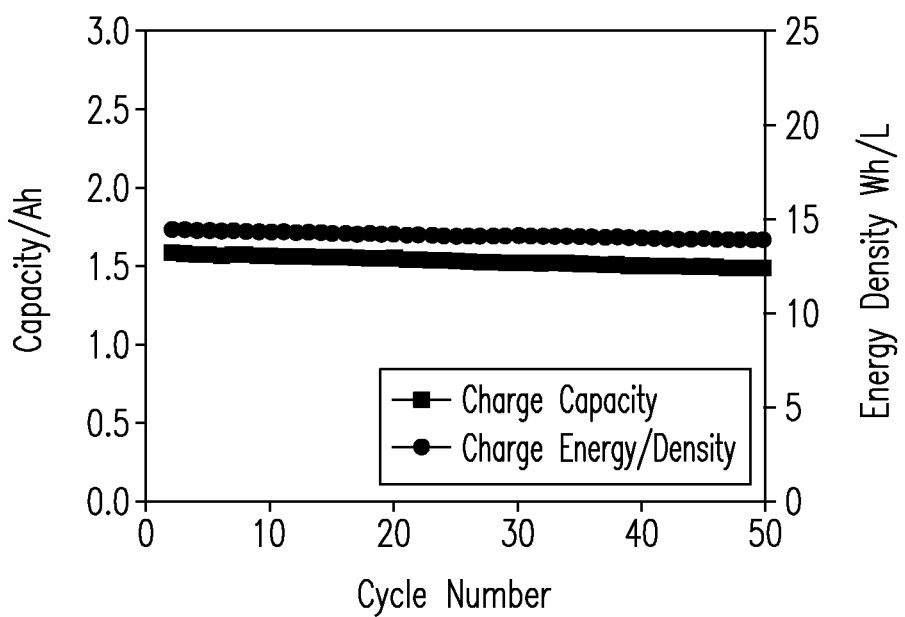
Figure 10A:
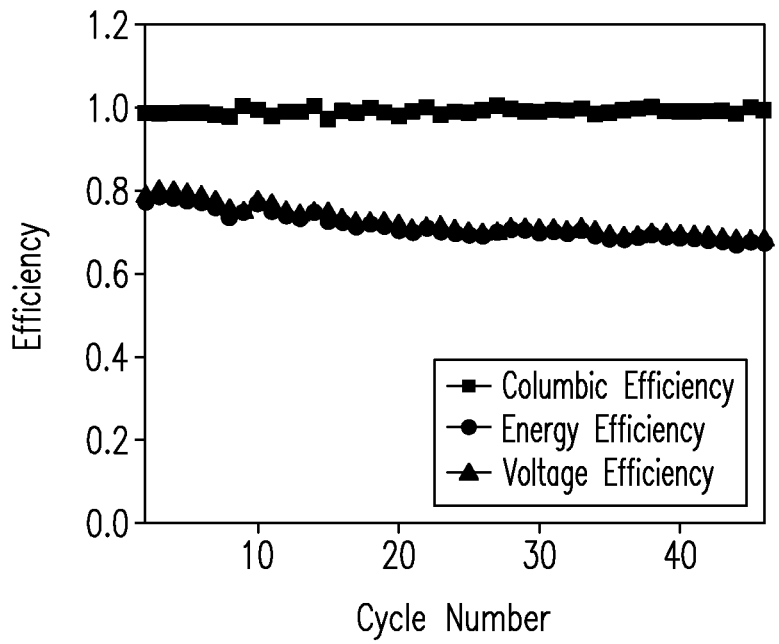
FIG. 10 shows cyclic Coulombic efficiency, voltage efficiency, and energy efficiency (a) as well as cell charge capacity and charge energy density change (b) for a Fe/V cell employing S-Radel as membrane.
Figure 10B:
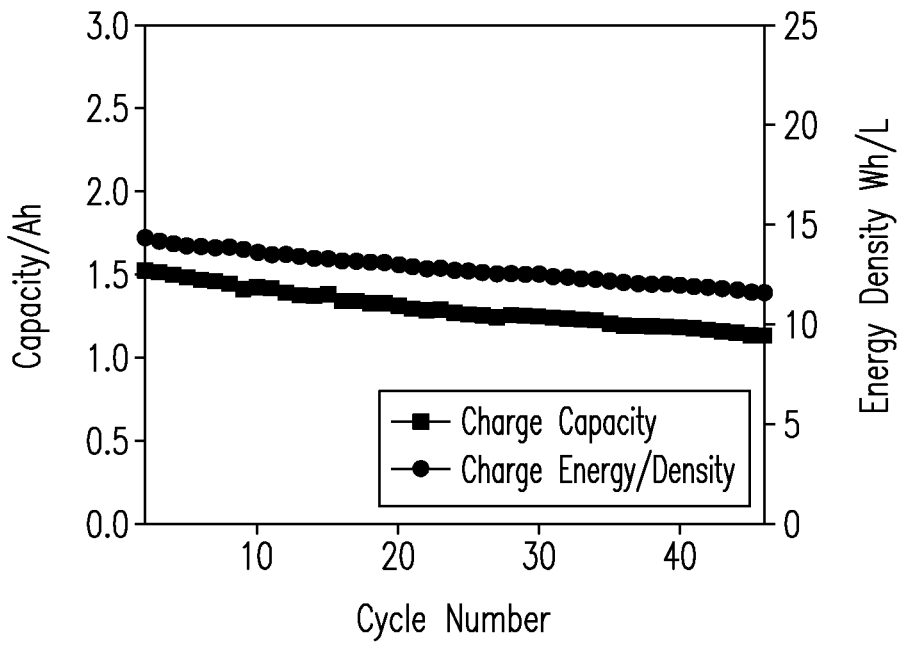

FIGS. 1-12 show a variety of embodiments and aspects of the present invention. FIGS. 1-7 show aspects of an all-vanadium RFB system. FIGS. 8-10 show aspects of an Fe/V RFB system. FIGS. 11-12 show aspects of a RFB system utilizing multiple redox reactions.

Referring first to FIG. 1, current versus voltage data is plotted for vanadium ion redox couples using either chloride or sulfate supporting solutions. Three redox couples were observed in the chloride system, indicating that two redox couples ($VO^{2+}/VO_2^+$ for the positive and $V^{2+}/V^{3+}$ for the negative) can be employed for a redox flow battery. Electrochemical reversibility of the $V^{4+}/V^{5+}$ couple was similar to that of a sulfate system, but that of the $V^{2+}/V^{3+}$ was significantly improved in the chloride system. For example, the peak potential difference is 0.351 V in the sulfate system and 0.509 V in the chloride system.

According to quantum chemistry calculations, the $V^{5+}$ species in the chloride solution forms $VO_2Cl(H_2O)_2$, which is a more stable neutral species than $[VO_2(H_2O)_3]^+$, the species commonly formed in the sulfate solution. However, $V^{2+}$, $V^{3+}$ and $V^{4+}$ in the chloride solution have a similar structure to that in the sulfate solution. Based on the above, the half cell reaction shown in Eq. (2) for the positive pole describes well the electrochemistry. The standard potential of this half cell reaction is expected to be slightly higher than that of the conventional sulfate system resulting from a different $V^{5+}$ species. By forming this new structure, the thermal stability of the $V^{5+}$ in the chloride solution was significantly improved.

$$VO_2^+ + 2H^+ + e \underset{C}{\overset{D}{\rightleftarrows}} VO^{2+} + H_2O \quad E° = 1.0V \text{ vs. NHE} \tag{1}$$

$$VO_2Cl + 2H^+ + e \underset{C}{\overset{D}{\rightleftarrows}} VO^{2+} + H_2O + Cl^- \quad E° = 1.0V + \alpha \text{ V vs. NHE} \tag{2}$$

$$V^{2+} \underset{C}{\overset{D}{\rightleftarrows}} V^{3+} + e \quad E° = -0.25V \text{ vs. NHE} \tag{3}$$

Figure 2A:
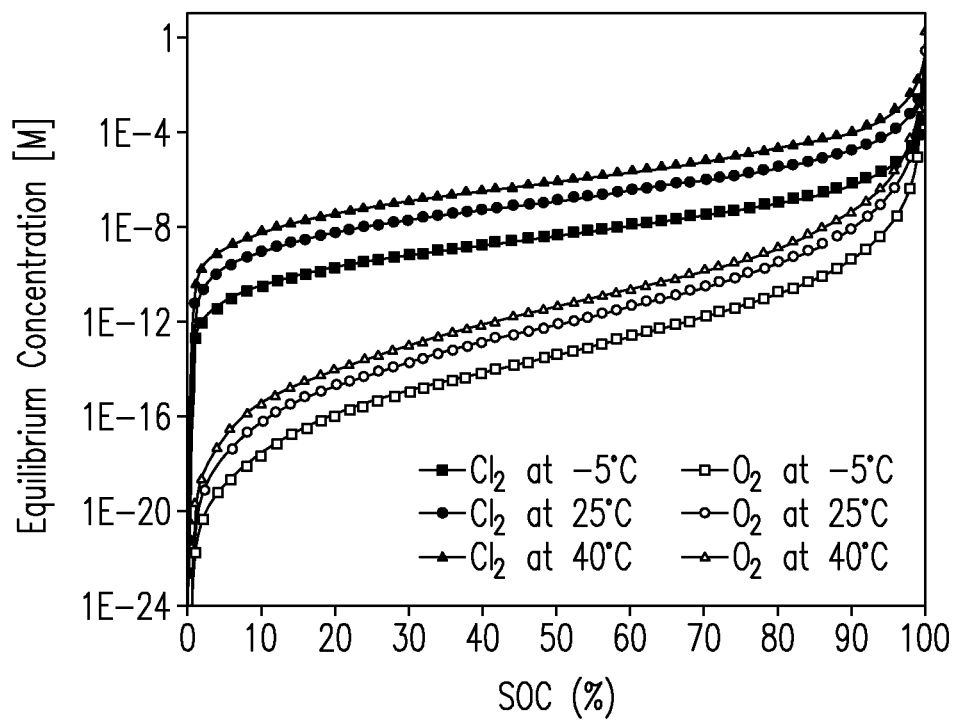
FIG. 2 compares thermodynamic equilibrium concentrations (a) and equilibrium potentials (b) of chlorine and oxygen gases in vanadium chloride RFB systems.

In the chloride system, oxygen and chlorine gas evolution during charging can reduce columbic efficiency. Referring to FIG. 2(a), equilibrium concentrations of chlorine or oxygen estimated from thermodynamic equilibrium for Eq. (1) and (4), and Eq. (1) and (5), respectively, are shown as a function at the state of charge (SOC) at various temperatures. It should be noted that hypochlorite can be negligible because the equilibrium constant of Eq. (6) is 6.35E-13 at 25° C. The actual concentrations of the chlorine should be lower than the values depicted in FIG. 2(a) due to complex formation. Within a typical operation window of redox flow batteries (i.e., SOC of 20~80%), the chlorine concentration is negligible even at 40° C. However, gas evolution may be significant at SOC values approaching 100%.

Figure 2B:
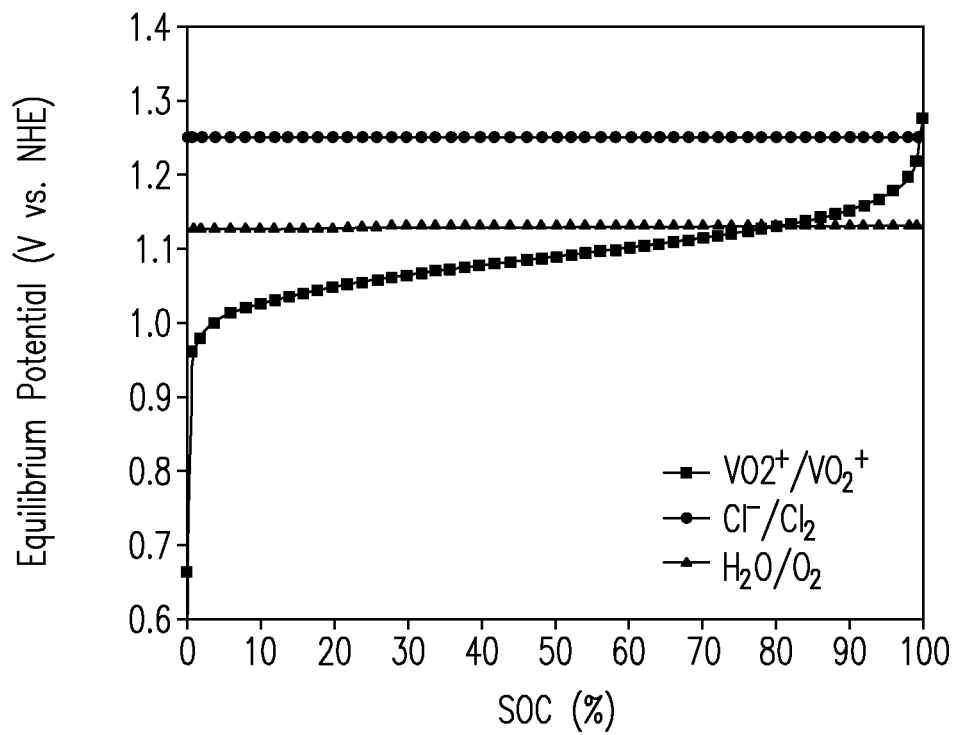

Chlorine has much higher solubility in water than oxygen; Henry's constant of chlorine and oxygen in water at 25° C. is 0.062 mol/L-atm and 0.0013 mol/L-atm, respectively. Assuming partial pressure of oxygen and chlorine is 0.1 bar, the equilibrium potential of Eq. (4) and (5) was calculated for 2.3 M V in 10 M total chloride system, and is shown in FIG. 2(b) as a function of SOC. Based on the data, $VO_2^+$ is thermodynamically stable from oxygen evolution below an 80% SOC, and from chlorine evolution below a 98% SOC. To maintain saturation of chlorine in the electrolyte solution, the flow battery is preferably operated in a closed system. A closed system is also advantageous to prevent rapid oxidation of $V^{2+}$ and $V^{3+}$ by air and to minimize electrolyte loss.

$$2Cl^- \rightleftarrows Cl_2 + 2e \quad E° = 1.36V \text{ vs. NHE} \tag{4}$$

$$2H_2O \rightleftarrows O_2 + 4H^+ + 4e \quad E° = 1.23V \text{ vs. NHE} \tag{5}$$

$$Cl_2 + H_2O \rightleftarrows 2H^+ + Cl^- + ClO^- \tag{6}$$

In addition to thermodynamic equilibrium, electrode overpotential can contribute to gas evolution. The equilibrium potential of reaction (4) is higher than that of reaction (5), but oxygen evolution can be negligible compared to chlorine evolution because of a higher overpotential on the electrode. For example, the chlorine evolution overpotential on a graphite porous electrode was 0.12 V at 25° C. at charge current of 22 mA/cm² for a $Zn/Cl_2$ battery (see N. Watanabe, T. Touhara, New Mat. New Processes, 1 (1981) 62). This overpotential was higher than that of the oxidation reaction in Eq. (2) above. Therefore, the chlorine evolution reaction can be negligible except for an SOC of ~100%. Because the electrode overpotential of chlorine evolution decreases with increasing temperature, charging is preferably controlled below SOC of 90~95% to prevent chlorine evolution, especially at elevated temperature.

The thermal stabilities of different vanadium ion species in either sulfate or chloride supporting solutions are summarized in Table 1. In the sulfate system, with more than 1.7 M vanadium, $V^{2+}$ and $V^{4+}$ experienced precipitation at low temperatures (-5° C. and 25° C.), and $V^{5+}$ suffered from precipitation at 40° C. In the chloride system, thermal stability was significantly improved. $V^{2+}$, $V^{4+}$ and $V^{5+}$ were stable for more than 10 days in the temperature ranges of -5 and 50° C. for 2.3 M vanadium. According to nuclear magnetic resonance data (not shown), $V^{5+}$ in the sulfate solution exists as a form of $[VO_2(H_2O)_3]^+$. With increasing temperature, this complex decomposed into $VO(OH)_3$ and $H_3O^+$, and then $VO(OH)_3$ is converted into a precipitate of $V_2O_5 \cdot 3H_2O$. As mentioned elsewhere herein, $V^{5+}$ is believed to exist as a stable neutral form of $VO_2Cl(H_2O)_2$ in the chloride solution. Regardless, the supporting solutions comprising $Cl^-$ can enable better stability at higher temperature.

TABLE 1

Comparison of thermal stability of $V^{n+}$ for chloride and sulfate systems.

| $V^{n+}$ species | $V^{n+}$ [M] | $H^+$ [M] | $SO_4^{2-}$ [M] | $Cl^-$ [M] | T (° C.) | Time for precipitation |
|---|---|---|---|---|---|---|
| $V^{2+}$ | 2 | 6 | 5 | 0 | -5 | 419 hr |
|  | 2 | 6 | 5 | 0 | 25 | Stable (>20 d) |
|  | 2 | 6 | 5 | 0 | 40 | Stable (>20 d) |
| $V^{3+}$ | 2 | 4 | 5 | 0 | -5 | Stable (>20 d) |
|  | 2 | 4 | 5 | 0 | 25 | Stable (>20 d) |
|  | 2 | 4 | 5 | 0 | 40 | Stable (>20 d) |
| $V^{4+}$ ($VO^{2+}$) | 2 | 6 | 5 | 0 | -5 | 18 hr |
|  | 2 | 6 | 5 | 0 | 25 | 95 hr |
|  | 2 | 6 | 5 | 0 | 40 | Stable (>20 d) |
| $V^{5+}$ ($VO_2^+$) | 2 | 8 | 5 | 0 | -5 | Stable (>20 d) |
|  | 2 | 8 | 5 | 0 | 25 | Stable (>20 d) |
|  | 2 | 8 | 5 | 0 | 40 | 95 hr |
|  | 1.8 | 8.4 | 5 | 0 | 40 | 358 hr |
| $V^{2+}$ | 2.3 | 5.4 | 0 | 10 | -5 | Stable (>20 d) |
|  | 2.3 | 5.4 | 0 | 10 | 25 | Stable (>20 d) |
|  | 2.3 | 5.4 | 0 | 10 | 40 | Stable (>20 d) |
| $V^{3+}$ | 1.5 | 3.0 | 0 | 7.5 | -5 | Stable (>20 d) |
|  | 1.8 | 3.0 | 0 | 8.4 | -5 | 124 hr |
|  | 2.3 | 3.1 | 0 | 10 | -5 | 96 hr |
|  | 2.3 | 3.1 | 0 | 10 | 25 | Stable (>20 d) |
|  | 2.3 | 3.1 | 0 | 10 | 40 | Stable (>20 d) |
| $V^{4+}$ ($VO^{2+}$) | 2.3 | 5.4 | 0 | 10 | -5 | Stable (>20 d) |
|  | 2.3 | 5.4 | 0 | 10 | 25 | Stable (>20 d) |
|  | 2.3 | 5.4 | 0 | 10 | 40 | Stable (>20 d) |
| $V^{5+}$ ($VO_2^+$) | 2.3 | 7.7 | 0 | 10 | -5 | Stable (>20 d) |
|  | 2.3 | 7.7 | 0 | 10 | 25 | Stable (>20 d) |
|  | 2.3 | 7.7 | 0 | 10 | 40 | Stable (>20 d) |
|  | 2.3 | 7.7 | 0 | 10 | 50 | Stable (>10 d) |

When operation of an all $Cl^-$ system occurs at, or below, freezing temperatures (i.e., 0° C.), the tank containing the electrolyte is preferably insulated to maintain waste heat from the flow battery, which can be approximately 20% of total energy. Operation above the freezing temperature, energy density can be improved by approximately 35% owing to higher vanadium concentration compared to the sulfate system. Stabilization of the $V^{3+}$ species at the lower temperature can be achieved by using a supporting solution containing both $SO_4^{2-}$ and $Cl^-$, as is described in greater detail elsewhere herein.

Typical energy efficiency of vanadium redox flow batteries is about 80%; indicating 20% of the energy is released as waste heat during each cycle. Assuming an adiabatic system, the electrolyte temperature can increase by about 4° C. per cycle. The thermal stability of electrolytes at higher temperatures can be a major concern, especially on hot days. For conventional all vanadium sulfate systems, active thermal management devices such as heat exchangers are commonly employed to maintain the cell temperature below 40° C. and to prevent precipitation of $V^{5+}$. An active thermal management system is not preferable and is a significant parasitic energy loss. Embodiments of the present invention based on vanadium and Cl-containing supporting solution can be operated at a wide range of temperatures between 0 to 50° C. without an active thermal management system, improving significant system efficiency and also reducing cost.

Flow cell performance for different chloride and sulfate systems were evaluated under the identical test conditions. The results at different discharging current densities were summarized in Table 2. Energy density of the chloride system was ~38 Wh/L, 30% higher than that of the sulfate system, resulting from the higher solubility of vanadium in the chloride solution. This higher energy density can reduce the system cost by reducing tank size and footprint. Columbic efficiency of the chloride system was 94~97% under operation of SOC between 0 and 100% (not inclusive), comparable to that of the sulfate system, which was 95~97%.

Cell performance of two different systems was measured using a flow cell system under identical test conditions. The apparent area of the graphite felt was 10 cm$^2$ (2 cm×5 cm), in contact with NAFION 117 membrane, a sulfonated tetrafluoroethylene based fluoropolymer-copolymer. Other proton-exchange membranes can be suitable. 2.3 M vanadium in 10 M total chloride solution and 1.7 M V in 5 M total sulphate solution were used for performance comparison. Each electrolyte volume and flow rate was 50 mL and 20 mL/min, respectively. The effect of different discharging current densities was evaluated in the first 5 cycles with the same charging current of 50 mA/cm$^2$. The flow cell was charged to 1.7 V and then discharged to 0.8 V. After that, the flow cell was cycled between 1.6 V and 1.2 V at 50 mA/cm$^2$.

The electrolyte stability tests were carried out in polypropylene tubes at −5, 25, 40, and 50° C., using about 5 ml solution for each sample. During the stability tests, the samples were kept static without any agitation, and were monitored daily by naked eye for the formation of precipitation.

Referring to Table 3, which summarizes the stability of $V^{2+}$, $V^{3+}$, $V^{4+}$, and $V^{5+}$ in sulfuric acid solutions, conventional sulfuric acid-only vanadium redox flow batteries (VRFB) can typically only be operated at cell temperatures between 10° C. and 40° C. with vanadium concentration in

TABLE 2

Comparison of discharging rate capability for VSRFB (1.7M V in 5M total sulphate) and VCRFB (2.3M V in 10M total chloride).

| CD (mA/cm$^2$) | Capacity (Ah) | | Energy density* (Wh/L) | | Efficiency | | | | | |
|---|---|---|---|---|---|---|---|---|---|---|
| | | | | | Coulomb | | Energy | | Voltage | |
| | Cl$^-$ | SO$_4^{2-}$ | Cl$^-$ | SO$_4^{2-}$ | Cl$^-$ | SO$_4^{2-}$ | Cl$^-$ | SO$_4^{2-}$ | Cl$^-$ | SO$_4^{2-}$ |
| 100 | 2.75 | 2.14 | 35.5 | 27.9 | 0.94 | 0.95 | 0.80 | 0.83 | 0.85 | 0.87 |
| 75 | 2.75 | 2.14 | 36.6 | 28.4 | 0.96 | 0.96 | 0.84 | 0.85 | 0.87 | 0.89 |
| 50 | 2.75 | 2.14 | 37.8 | 29.1 | 0.97 | 0.96 | 0.87 | 0.88 | 0.90 | 0.91 |
| 25 | 2.74 | 2.13 | 38.7 | 29.7 | 0.97 | 0.97 | 0.90 | 0.91 | 0.92 | 0.94 |

*Note that energy density was calculated only by electrolyte volume.

Cyclic performance of both systems at ambient temperature was also evaluated by cycling between 1.6V and 1.2V, which are shown in FIG. 3. The capacities of both systems slightly decreased with cycles because of different transport rate of vanadium species across the membrane. This capacity loss can be recovered by remixing and rebalancing negative electrolyte and positive electrolyte because a single element of V is used for both solutions. Energy and coulombic efficiencies for the chloride system was stable with cycles and comparable to those of sulfate system. It can be concluded that the novel all vanadium chloride flow battery can be stably operated in a comparable energy efficiency to the sulfate system, while delivering energy density of ~38 Wh/L, 30% higher than the sulfate system. Chlorine evolution or $V^{5+}$ electrolyte stability in the chloride solution was not an issue under closed operation conditions.

Electrolyte for the all vanadium chloride systems described above was prepared by dissolving $V_2O_3$ in concentrated HCl (38%). The electrolyte for the all vanadium sulphate system was fabricated by dissolving $VOSO_4 \cdot 3.8H_2O$ in sulfuric acid (95.8%).

Cyclic voltammetry (CV) tests for the chloride system were conducted with identical graphite felts (ϕ=5 mm) used in flow cell testing to identify redox couples and electrochemical reversibility using Solartron 1287 potentiostat. The scan rate was 0.5 mV/s.

the electrolytes less than 1.7 M (with an energy density <25 Wh/L). The electrochemical reactions of an all vanadium sulfate redox flow battery are represented by the following equations.

Positive electrolyte:
$$VO^{2+} + H_2O - e \underset{\text{discharge}}{\overset{\text{charge}}{\rightleftarrows}} VO_2^+ + 2H^+ + e \quad E° = 1.00V \quad (7)$$

Membrane:
$$H^+ \text{ (positive electrolyte)} \underset{\text{discharge}}{\overset{\text{charge}}{\rightleftarrows}} H^+ \text{ (negative electrolyte)} \quad (8)$$

Negative electrolyte:
$$V^{3+} + e \underset{\text{discharge}}{\overset{\text{charge}}{\rightleftarrows}} V^{2+} \quad E° = -0.25V \quad (9)$$

Overall:
$$VO^{2+} + H_2O + V^{3+} \underset{\text{discharge}}{\overset{\text{charge}}{\rightleftarrows}} VO_2^+ + 2H^+ + V^{2+} \quad E° = 1.25V \quad (10)$$

-continued

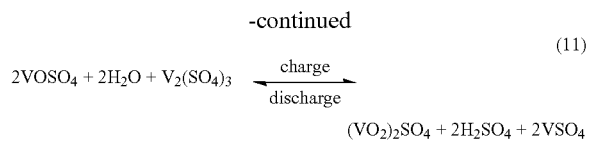

(11)

$$(VO_2)_2SO_4 + 2H_2SO_4 + 2VSO_4$$

TABLE 3

Stability of $V^{n+}$ cations in $H_2SO_4$ solution

| $V^{n+}$ specie | $V^{n+}$, M | $H^+$, M | $SO_4^{2-}$, M | T, °C. | Time for precipitation |
|---|---|---|---|---|---|
| $V^{2+}$ | 2 | 6 | 5 | −5 | Stable (>10 d) |
| | 2 | 6 | 5 | 25 | Stable (>10 d) |
| | 2 | 6 | 5 | 40 | Stable (>10 d) |
| $V^{3+}$ | 2 | 4 | 5 | −5 | Stable (>10 d) |
| | 2 | 4 | 5 | 25 | Stable (>10 d) |
| | 2 | 4 | 5 | 40 | Stable (>10 d) |
| $V^{4+}$ ($VO^{2+}$) | 2 | 6 | 5 | −5 | 18 hr |
| | 2 | 6 | 5 | 25 | 95 hr |
| | 2 | 6 | 5 | 40 | Stable (>10 d) |
| $V^{5+}$ ($VO^{2+}$) | 2 | 8 | 5 | −5 | Stable (>10 d) |
| | 2 | 8 | 5 | 25 | Stable (>10 d) |
| | 2 | 8 | 5 | 40 | 95 hr |

As mentioned earlier, since the standard potential of reaction $2Cl^- - 2e = Cl_2$ (g)(E°=1.36 V) is much higher than that of Reaction (7), the supporting solution in a VRFB system can comprise $Cl^-$ either as a $SO_4^{2-}$ and $Cl^-$ mixture or comprising $Cl^-$ as the only anion. Moreover, as is described elsewhere herein, the use of mixed $SO_4^{2-}$ and $Cl^-$ in the supporting solution is not limited to vanadium-based redox flow batteries. Chloride and sulfate ions in the supporting solution can help stabilize relatively higher concentrations of other cations as well.

Figure 4:
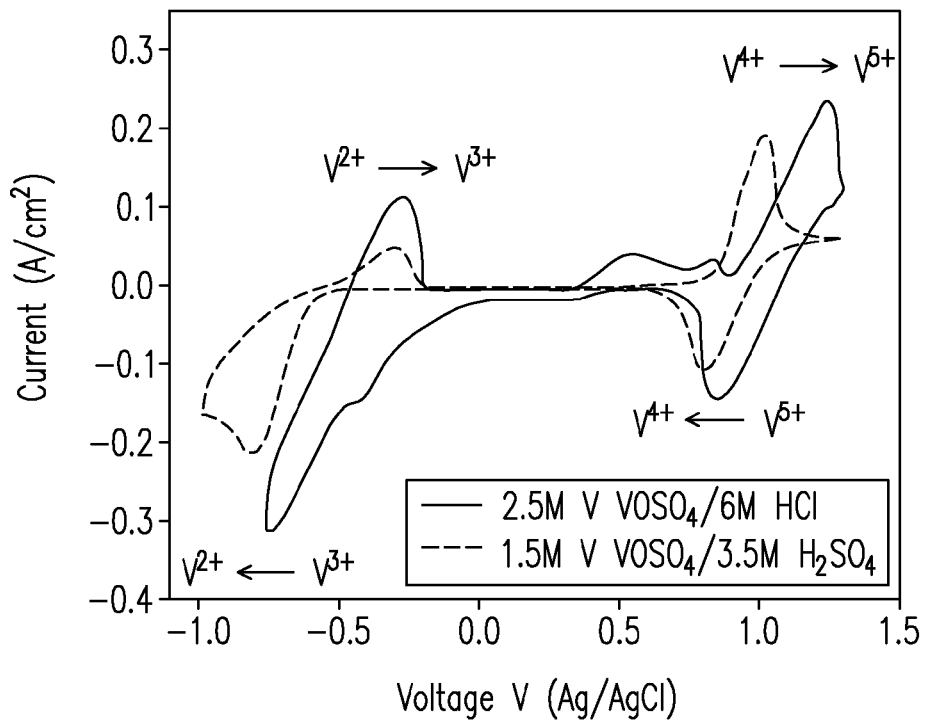
FIG. 4 compares cyclic voltammetry curves of a vanadium-chloride-sulfate solution and a vanadium sulfate solution.
Figure 5:
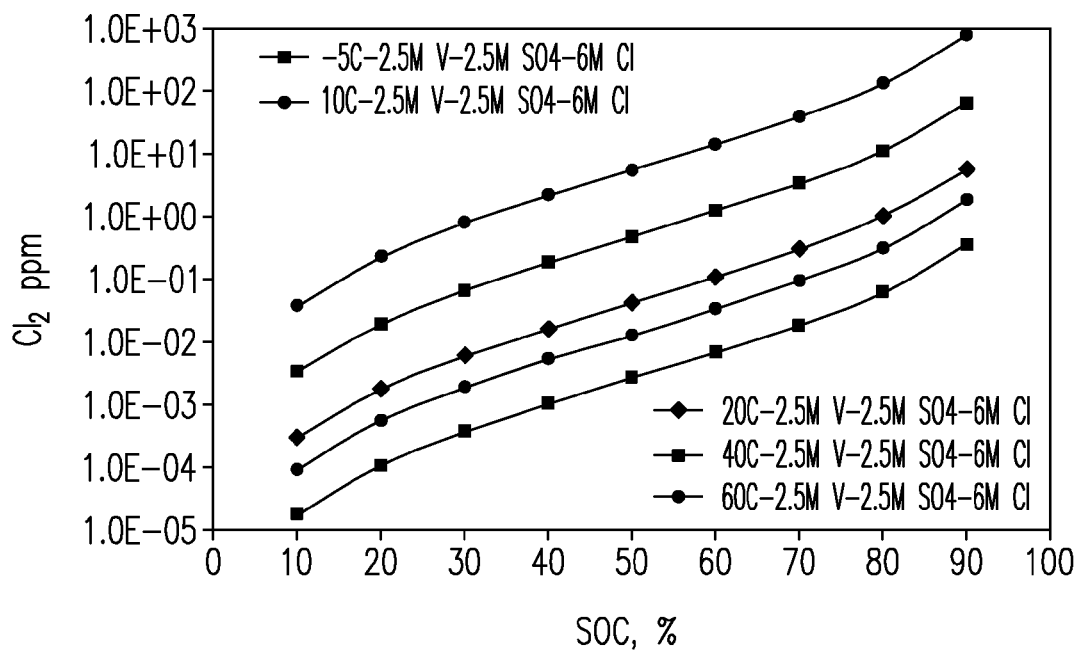
FIG. 5 is a graph of equilibrium concentrations of chlorine in the positive side of a vanadium-chloride-sulfate cell at various states of charge.

FIG. 4 shows the cyclic voltammetry curve of a solution containing 2.5 M $VOSO_4$ and 6 M HCl. This curve is similar to that of a solution containing 1.5 M $VOSO_4$ and 3.5 M $H_2SO_4$. Referring to FIG. 5, the equilibrium concentrations of $Cl_2$ gas in a vanadium sulfate-chloride positive electrolyte solution (containing 2.5 M vanadium, 2.5 M sulfate, and 6 M chloride) under different state-of-charge (SOC) conditions were calculated according to Reaction 12. Under normal flow battery operation conditions (i.e. T<40° C. and SOC<80%), the equilibrium concentration of $Cl_2$ gas is less than 10 ppm. Due to its high solubility in water (0.57 g $Cl_2$ per 100 g water at 30° C.), most of the $Cl_2$ gas generated should be dissolved in the positive electrolyte solutions. At high temperatures, SOC values higher than 80% are preferably avoided to minimize the $Cl_2$ gas evolution. Nevertheless, a closed system can be used to minimize continuous $Cl_2$ gas generation and to prevent $Cl_2$ gas emission to the environment. Such closed systems are commonly required for the conventional vanadium sulfate flow battery system to prevent oxidation of $V^{2+}$ and $V^{3+}$ by $O_2$ in air, and to prevent water loss from electrolyte solutions.

$$2VO_2^+(a) + 4H^+(a) + 2Cl^-(a) = 2VO^{2+}(a) + Cl_2(g) + 2H_2O \quad (12)$$

The stability of different $V^{n+}$ cations in Cl-containing solutions was evaluated at a temperature range of −5° C. to 40° C. The results are given in Table 4. More than 2.3 M $VOCl_2$ and $VO_2Cl$ were stabilized in ~6 M HCl solution over a temperature range of −5° C. to 40° C., which is much higher than those in the sulfuric acid solution (~1.5 M vanadium) over the same temperature range. The $Cl^-$ anions appears to stabilize $VO_2^+$ and $VO^{2+}$ cations in the solution. Similar to that in the $H_2SO_4$ solution, more than 2.3 M $V^{2+}$ was also stabilized in ~6 M HCl solution at −5° C. to 40° C. However, compared to that in the $H_2SO_4$ solution, the stability of $V^{3+}$ in HCl solution was decreased. At −5° C., only about 1.5 M $V^{3+}$ could be stabilized in 3 M HCl, whereas more than 2 M $V^{3+}$ was stabilized in 2 M $H_2SO_4$ (see Table 4).

TABLE 4

Stability of $V^{n+}$ cations in HCl solution

| $V^{n+}$ specie | $V^{n+}$, M | $H^+$, M | $Cl^-$, M | T, °C. | Time for precipitation |
|---|---|---|---|---|---|
| $V^{2+}$ | 2.3 | 5.4 | 10 | −5 | Stable (>10 d) |
| | 2.3 | 5.4 | 10 | 25 | Stable (>10 d) |
| | 2.3 | 5.4 | 10 | 40 | Stable (>10 d) |
| $V^{3+}$ | 1.5 | 3.0 | 7.5 | −5 | Stable (>10 d) |
| | 1.8 | 3.0 | 8.4 | −5 | 124 hr |
| | 2.3 | 3.1 | 10 | −5 | 96 hr |
| | 2.3 | 3.1 | 10 | 25 | Stable (>10 d) |
| | 2.3 | 3.1 | 10 | 40 | Stable (>10 d) |
| $V^{4+}$ ($VO^{2+}$) | 2.3 | 5.4 | 10 | −5 | Stable (>10 d) |
| | 2.3 | 5.4 | 10 | 25 | Stable (>10 d) |
| | 2.3 | 5.4 | 10 | 40 | Stable (>10 d) |
| $V^{5+}$ ($VO_2^+$) | 2.3 | 7.7 | 10 | −5 | Stable (>10 d) |
| | 2.3 | 7.7 | 10 | 25 | Stable (>10 d) |
| | 2.3 | 7.7 | 10 | 40 | Stable (>10 d) |

Based on the stability test results above, $Cl^-$ anions can help stabilizing $VO^{2+}$ and $VO_2^+$ cations, and $SO_4^{2-}$ anions can help stabilize $V^{3+}$ cations. Both and $Cl^-$ and $SO_4^{2-}$ anions can stabilize $V^{2+}$ cations. Accordingly, a sulfuric acid and hydrochloric acid mixture can stabilize high concentrations of all four vanadium cations. Table 5 gives the stability of different $V^{n+}$ cations in two mixed $SO_4^{2-}$ and $Cl^-$ solutions at −5° C. to 40° C. Without optimization, about 2.5 M of all four $V^{n+}$ cations were effectively stabilized in the 2.5 M $SO_4^{2-}$-6 M $Cl^-$ mixed acid solution. At a higher vanadium concentration (3M), $V^{2+}$, $VO^{2+}$, and $VO_2^+$ were also stabilized in the 3 M $SO_4^{2-}$-6 M $Cl^-$ mixed acid solution at −5° C. to 40° C. However, $V^{3+}$ was stable for about 8 days at −5° C. Precipitation of VOCl was observed. Due to the large amount of heat generation during the operation of a VRFB system, it is not difficult to keep the cell temperature of the electrolytes higher than −5° C. even when the ambient temperature is −5° C. or lower. Also, since a VRFB system is always operated under 80 to 90% state-of-charge and state-of-discharge conditions, the highest concentration of $V^{3+}$ in a 3 M all vanadium flow battery system is 2.7 M (mixing with 0.3 M $V^{2+}$, at the end of 90% discharge) or 2.4 M (mixing with 0.6 M $V^{2+}$, at the end of 80% discharge). Therefore, in one embodiment, by using a sulfuric acid and hydrochloric acid mixture as the supporting solution, the VRFB system uses a supporting solution with a total vanadium concentration higher than 3 M.

TABLE 5

Stability of $V^{n+}$ in the $SO_4^{2-}$ + $Cl^-$ solutions

| $V^{n+}$ specie | $V^{n+}$ [M] | $H^+$ [M] | $SO_4^{2-}$ [M] | $Cl^-$ [M] | T (°C.) | Time for precipitation |
|---|---|---|---|---|---|---|
| $V^{2+}$ | 3 | 6 | 3 | 6 | −5 | Stable (>10 d) |
| | 2.5 | 6 | 2.5 | 6 | −5 | Stable (>10 d) |
| | 2.5 | 6 | 2.5 | 6 | 25 | Stable (>10 d) |
| | 2.5 | 6 | 2.5 | 6 | 40 | Stable (>10 d) |
| | 3 | 6 | 3 | 6 | 40 | Stable (>10 d) |
| $V^{3+}$ | 3 | 3 | 3 | 6 | −5 | 192 hr (8 d) |
| | 2.5 | 3.5 | 2.5 | 6 | −5 | Stable (>10 d) |
| | 2.5 | 3.5 | 2.5 | 6 | 25 | Stable (>10 d) |

TABLE 5-continued

Stability of $V^{n+}$ in the $SO_4^{2-}$ + $Cl^-$ solutions

| $V^{n+}$ specie | $V^{n+}$ [M] | $H^+$ [M] | $SO_4^{2-}$ [M] | $Cl^-$ [M] | T (° C.) | Time for precipitation |
|---|---|---|---|---|---|---|
| | 2.5 | 3.5 | 2.5 | 6 | 40 | Stable (>10 d) |
| | 3 | 3 | 3 | 6 | 40 | Stable (>10 d) |
| $V^{4+}$ ($VO^{2+}$) | 3 | 6 | 3 | 6 | −5 | Stable (>10 d) |
| | 2.5 | 6 | 2.5 | 6 | −5 | Stable (>10 d) |
| | 2.5 | 6 | 2.5 | 6 | 25 | Stable (>10 d) |
| | 2.5 | 6 | 2.5 | 6 | 40 | Stable (>10 d) |
| | 3 | 6 | 3 | 6 | 40 | Stable (>10 d) |
| $V^{5+}$ ($VO_2^+$) | 3 | 9 | 3 | 6 | −5 | Stable (>10 d) |
| | 2.5 | 8.5 | 2.5 | 6 | −5 | Stable (>10 d) |
| | 2.5 | 8.5 | 2.5 | 6 | 25 | Stable (>10 d) |
| | 2.5 | 8.5 | 2.5 | 6 | 40 | Stable (>10 d) |
| | 3 | 9 | 3 | 6 | 40 | Stable (>10 d) |
| | 2.7 $V^{5+}$ + 0.3 $V^{4+}$ | 7.7 | 3 | 6 | 50 | Stable (>10 d) |
| | 2.7 $V^{5+}$ + 0.3 $V^{4+}$ | 7.7 | 3 | 6 | 60 | Stable (>10 d) |

At temperatures higher than 40° C., in traditional all-vanadium sulfate RFBs the stability of $V^{5+}$ might decrease due to the formation of $V_2O_5$. However, as shown in Table 5, embodiments of the present invention using mixed $SO_4^{2-}$-$Cl^-$ solutions exhibit excellent stability with a mixture of 2.7 M $V^{5+}$ and 0.3 M $V^{4+}$ (corresponding to 90% of state-of-charge of a 3 M VRFB system) at temperatures as high as 60° C., indicating that $Cl^-$ anions can effectively stabilize the $VO_{2+}$ cations. As described elsewhere herein, quantum chemistry calculations show that, in Cl-containing solutions, a stable neutral species can form having the formula $VO_2Cl(H_2O)_2$. Referring to FIG. 6, a diagram depicts the molecular structure of $[VO_2(H_2O)_3]^+$ and of $VO_2Cl(H_2O)_2$. In this structure, one $Cl^-$ anion, two $O^{2-}$ anions, and two $H_2O$ molecules complex with one $V^{5+}$ in the first coordination shell. Without $Cl^-$ anions in the solution, two $O^{2-}$ anions, and three $H_2O$ molecules complex with $V^{5+}$ in the first coordination shell and a positively-charged specie with $[VO_2(H_2O)_3]^+$ formula forms. Quantum chemistry calculations also indicate that, at elevated temperatures, this positively charged species is prone to convert to $V_2O_5 \cdot 3H_2O$ by de-protonation (Reaction 13) and condensation (Reaction 14). The structural differences appear to account for the much improved stability of $VO_2^+$ cations in $Cl^-$-containing solutions. Due to the formation of stable $VO_2Cl(H_2O)_2$ structure, the equilibrium concentration of $Cl_2$ gas in the positive electrolyte solution should be lower than that shown in FIG. 5.

In embodiments comprising mixed $SO_4^{2-}$-$Cl^-$ solutions, the stability of $V^{4+}$ is controlled by the solubility of $VOSO_4$, and the stability of $V^{3+}$ is controlled by the solubility of $VOCl$. The improvement of $V^{4+}$ stability is due to the decrease of $SO_4^{2-}$ concentration in the solution, and the improvement of $V^{3+}$ stability is due to the decrease of $Cl^-$ concentration. $V^{2+}$ cation is stable in both $Cl^-$ and $SO_4^{2-}$-containing solutions.

In traditional all-vanadium sulfate RFBs, energy efficiency is about 80%, which means about 20% of the total energy is lost as waste heat during each cycle. For an adiabatic system, this heat can raise the temperature of the whole system by about 5° C. Due to the large amount of waste heat generation, stability of electrolytes at high temperature range is a major concern, especially during hot days. The embodiments of the present invention encompassing all-vanadium RFBs utilizing mixed $SO_4^{2-}$-$Cl^-$ supporting solutions system can not only improve the energy density, but can also expand the operation temperature window from 10-40° C. to −5-60° C. During the cold winter days, limited insulation can easily keep the temperature of the system above −5° C. Accordingly, in preferred embodiments, no active heat management is needed.

Several small VRFB cells were used to evaluate the performances of two vanadium sulfate-chloride mixed systems (with 2.5 M and 3.0 M vanadium). For comparison, the performance of a vanadium sulfate system (with 1.6 M vanadium) was also measured. The results are summarized in Table 6. The sulfate-chloride mixed systems show much higher energy density than the sulfate system. Even with higher vanadium concentration, the all vanadium sulfate-chloride mixed systems still showed similar energy efficiency to that of the vanadium sulfate system. FIG. 7 provides the cyclic coulombic efficiency, voltage efficiency, and energy efficiency of the 2.5 M all vanadium sulfate-chloride mixed acid system at different ambient temperatures. Stable performance was observed with this new system. During a course of 20 days of operation, the gas-phase pressures of the negative electrolyte and positive electrolyte containers remained constant, indicating no significant gas evolution occurred in the whole system. The viscosity and density of a solution containing 2.5 M $VOSO_4$ and 6 M HCl at 30° C. is 6.1 cP and 1.40 g/ml respectively, slightly lower than the 6.4 cP and 1.45 g/ml for a solution containing 2.0 M $VOSO_4$ and 3.0 M $H_2SO_4$.

TABLE 6

Performance of all vanadium redox flow cells using the mixed $SO_4^{2-}$-$Cl^-$ supporting solutions

| Current of Discharge, mA/cm² | Energy Density Wh/L | | | Coulombic Efficiency $\eta_C$ | | | Energy Efficiency $\eta_E$ | | | Voltage Efficiency $\eta_V$ | | |
|---|---|---|---|---|---|---|---|---|---|---|---|---|
| | 2.5VS 6Cl | 3VS 6Cl | 1.6V 4.5S | 2.5VS 6Cl | 3VS 6Cl | 1.6V 4.5S | 2.5VS 6Cl | 3VS 6Cl | 1.6V 4.5S | 2.5VS 6Cl | 3VS 6Cl | 1.6V 4.5S |
| 100 | 36.2 | 39.5 | 22.3 | 0.95 | 0.95 | 0.94 | 0.81 | 0.76 | 0.83 | 0.85 | 0.80 | 0.88 |
| 75 | 37.5 | 40.8 | 22.4 | 0.96 | 0.96 | 0.94 | 0.84 | 0.81 | 0.85 | 0.88 | 0.84 | 0.90 |
| 50 | 38.5 | 41.8 | 22.6 | 0.96 | 0.97 | 0.94 | 0.87 | 0.85 | 0.87 | 0.91 | 0.88 | 0.92 |
| 25 | 39.2 | 43.1 | 22.6 | 0.96 | 0.97 | 0.94 | 0.90 | 0.89 | 0.88 | 0.93 | 0.91 | 0.94 |

1. Cell operation conditions: 10 cm² flow cell, Charged to 1.7 V by 50 mA/cm² current.
2. 2.5VS 6HCl: 2.5M V 2.5M $SO_4^{2-}$ 6M $Cl^-$; 3VS6HCl: 3M V 3M $SO_4^{2-}$ 6M $Cl^-$; 1.6V 4.5S: 1.6M V 4.5M $SO_4^{2-}$.

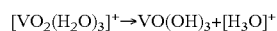

$$[VO_2(H_2O)_3]^+ \rightarrow VO(OH)_3 + [H_3O]^+ \quad (13)$$

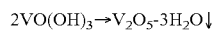

$$2VO(OH)_3 \rightarrow V_2O_5 \cdot 3H_2O\downarrow \quad (14)$$

The experiment details related to the all-vanadium RFBs using mixed $SO_4^{2-}$-$Cl^-$ supporting solutions are as follows. The flow cells consisted of two graphite electrodes, two gold-coated copper current collectors, two PTFE gaskets, and a Nafion® 117 membrane. The active area of the electrode and the membrane was about 10 cm². An Arbin battery tester was used to evaluate the performance of flow cells and to control the charging and discharging of the electrolytes. A Solartron 1287 potentiostat was employed for cyclic voltammetry (CV) experiments. The flow rate was fixed at 20 mL/min, which was controlled by a peristaltic pump. A balanced flow cell contained about 50 mL negative electrolyte and 50 mL positive electrolyte.

For cell performance evaluation and electrolyte solution preparation, the cell was normally charged at a current density of 50 mA/cm² to 1.7 V and discharged to 0.8 V with a current density of 25 to 100 mA/cm². Cell cycling tests were performed at 90% state-of-charge and state-of-discharge at a fixed charging and discharging current density of 50 mA/cm².

The electrolyte solutions of $V^{2+}$, $V^{3+}$, $V^{4+}$ and $V^{5+}$ used in this work were prepared electrochemically in flow cells using $VOSO_4$ (from Alfa Aesar) and $VCl_3$ as starting chemicals. $VCl_3$ solutions were prepared by dissolving $V_2O_3$ (from Alfa Aesar) in HCl solutions. The electrolyte stability tests were carried out in polypropylene tubes at −5° C., ambient temperature, 40° C., 50° C., and 60° C., using about 5 ml solution for each sample. During the stability tests, the samples were kept static without any agitation, and were monitored daily by naked eye for the formation of precipitation. Solution viscosity was measured using a Ubbelohde calibrated viscometer tube.

Thermodynamic calculations of reaction $2VO_2^+(a)+4H^+(a)+2Cl^-(a)=2VO^{2+}$ were carried out using HSC Chemistry® 6.1 program from Outotec Research Oy. Quantum chemistry calculations were carried out using the Amsterdam Density Functional (ADF) program.

Yet another embodiment of the present invention encompasses a redox flow battery system based on the redox couple of Fe and V. In this system, the negative electrolyte comprises $V^{2+}$ and $V^{3+}$ in the supporting solution while the positive electrolyte comprises $Fe^{2+}$ and $Fe^{3+}$ in the supporting solution. The redox reactions and their standard potentials can be described as follows:

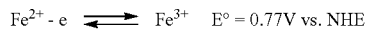
(15)

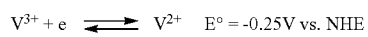
(16)

(17)

The Fe/V system of the present invention can provide significant benefits while circumventing some of the intrinsic issues of conventional systems. For example, certain embodiments of the Fe/V system do not use catalysts and/or high-temperature management systems, which add to the complexity and cost of the system. Moreover the evolution of $H_2$ gas during charging is minimized since the working potential of $V^{2+}/V^{3+}$ (~−0.25 V) is considerably higher than that of others, such as $Cr^{2+}/Cr^{3+}$ (−0.41 V). In the positive electrolyte, the $Fe^{2+}/Fe^{3+}$ redox couple is electrochemically reversible and can be less oxidative than other common ionic species, such as $V^{4+}/V^{5+}$, which can result in higher stability at high temperatures while avoiding expensive, oxidation-resistant membrane materials, such as sulfonated tetrafluoroethylene based fluoropolymer-copolymer.

In one example using mixed Fe and V reactant solutions, an electrolyte for Fe/V redox flow battery tests was prepared by dissolving $VCl_3$ (99%) and $FeCl_2$ (98%) in concentrated HCl (38%). Cyclic voltammetry (CV) was carried out in Fe/V+HCl solutions with various concentrations to identify redox couples and electrochemical reversibility using a SOLARTRON 1287 potentiostat (SOLARTRON ANALYTICAL, USA). A Pt wire and Ag/AgCl electrode were used as the counter and reference electrodes, respectively. Glassy carbon electrodes and graphite felt (φ=5.5 mm) sealed onto a metal current collector were used as the working electrodes. The scan rate was 0.5 mV/s. Identical graphite felts without redox catalysts were used in both CV and flow cell testing.

Cell performance was measured under constant current methods using a flow cell system. The apparent area of graphite felt was 10 cm² (2 cm×5 cm), in contact with membrane. 1.25 M Fe/V in 2.3 M HCl solution and 1.17 M Fe/V in 2.15 M HCl solution were used with either a sulfonated tetrafluoroethylene based fluoropolymer-copolymer (i.e., NAFION) or a low-cost hydrocarbon membrane such as sulfonated poly(phenylsulfone) membrane (i.e., S-RADEL), respectively. Each electrolyte volume and flow rate was 50 mL and 20 mL/min. The flow cell was charged to 1.3 V and then discharged to 0.5 V at a current density of 50 mA/cm².

The chemical stability of commercially available membranes was determined by soaking them in 0.15 M $Fe^{3+}$ and 7 M total chloride solution at 40° C., and in 0.1 M $V^{5+}$ and 5 M total sulfate solution for comparison. During the stability tests, the samples were kept static without any agitation, and were monitored daily by naked eye for changes of color indicating oxidation of the membrane.

FIGS. 8(a) and (b) show CV results of 1.5 M Fe and V in a 1 M hydrochloric acid supporting solution using glassy carbon and graphite felt electrode, respectively. The current density is normalized to the geometrical area of the working electrode. Similar CV spectra were observed on both the glassy carbon and graphite felt working electrode with the graphite felt electrode demonstrating higher over potential due to the low conductivity. Two redox peaks were observed indicating two redox reactions, $Fe^{3+}/Fe^{2+}$ for the positive and $V^{2+}/V^{3+}$ for the negative. More importantly, no significant hydrogen evolution current was observed at potentials below the $V^{3+}$ reduction peak, indicating that no significant gas evolution occurred at the negative electrode during the charging process when employing a $V^{2+}/V^{3+}$ redox couple. Oxidation and reduction peaks appear in the forward and reverse scans on the positive side, which revealed a reversible redox couple of $Fe^{3+}/Fe^{2+}$ with a potential at approximately 0.5 V. Similarly, there is no anodic current observed associated with evolution of the $Cl_2$ and/or $O_2$ gas. Thus, the $Fe^{3+}/Fe^{2+}$ and $V^{3+}/V^{2+}$ redox couples in chloride supporting solution can be used in the negative and positive half cells according to embodiments of the present invention.

Figure 3A:
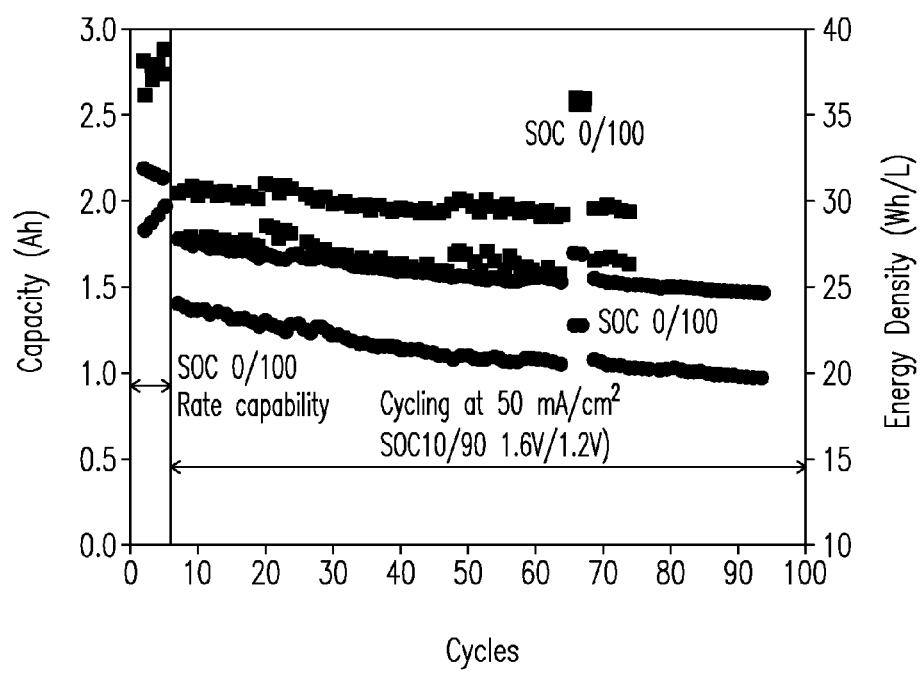
FIG. 3 compares cyclic performances of vanadium chloride RFB systems and vanadium sulfate RFB systems.
Figure 3B:
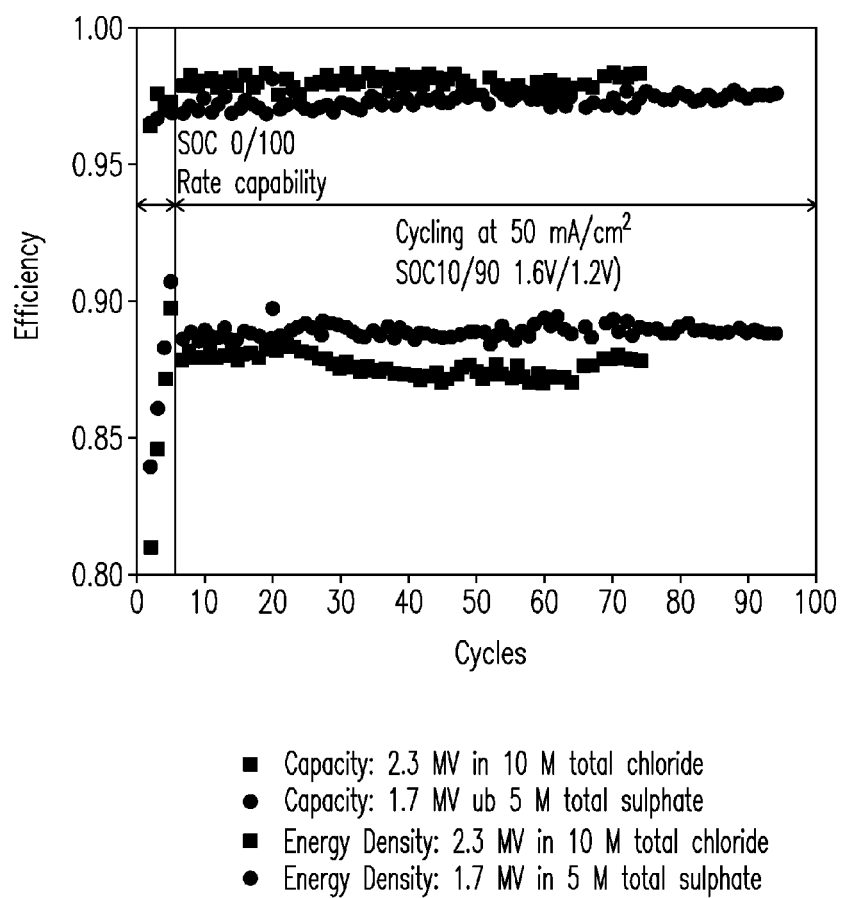

FIG. 3 shows the results of Fe/V flow cell testing with a NAFION 117 membrane. A plot of cell voltage versus time is given in FIG. 3(a). FIG. 3(b) demonstrates the cell voltage profile with respect to the cell capacity and the cell SOC. The SOC is calculated against the maximum charge capacity. Referring to FIG. 3(b), the Fe/V redox flow cell can be charged and discharged to a SOC in the range of 0~100%. A utilization ratio of close to 100% can be achieved. Up to 50 cycles, the Fe/V cell demonstrated stable columbic efficiency of ~97%, energy efficiency of ~78%, and voltage efficiency of ~80% as shown in FIG. 3(c). The Fe/V cell also demonstrated excellent capacity and energy density retention capability as shown in FIG. 3(d) with 0.1% loss per cycle in charge capacity over 50 cycles.

Commercially available, low-cost membranes, including a micro-porous separator, can be used in place of relatively expensive NAFION (i.e., sulfonated tetrafluoroethylene based fluoropolymer-copolymer) membranes. Suitable alternative membranes can include, but are not limited to, hydrocarbon-based commercially available ion-exchange membranes; for example, SELEMION® anion exchange membrane (APS, from Asahi Glass, Japan), SELEMION® cation exchange membrane (CMV, from Asahi Glass, Japan), and sulfonated poly(phenylsufone) membrane (S-RADEL® (RADEL® from Solvay Advanced Polymers, USA), and micro-porous separators typically used in lithium battery, for example; CELGARD® micro-porous separator (Celgard, USA).

The electrochemical performance of a Fe/V cell employing a S-RADEL membrane was then evaluated using identical test protocols to that of Nafion membrane. The cell performance data is shown in FIGS. 5(a) and (b). Similar Coulombic efficiency, voltage efficiency, and energy efficiency with that of Nafion membrane were obtained.

In a preferred embodiment, the energy density of Fe/V RFB systems can be improved by using a supporting solution comprising $SO_4^{2-}$-$Cl^-$ mixed ions to increase the reactant concentration in the negative electrolyte and positive electrolyte. Referring to Table 7, the solubility of $Fe^{2+}$ and $Fe^{3+}$ ions is higher in $H_2SO_4$—HCl mixed acids than in hydrochloric acid.

TABLE 7

Stability of $Fe^{n+}$ cations in the $H_2SO_4$—HCl mixed solutions

| $Fe^{n+}$ specie | $Fe^{n+}$, M | $H^+$, M | $SO_4^{2-}$, M | $Cl^-$, M | T, °C. | Time for precipitation |
|---|---|---|---|---|---|---|
| $Fe^{2+}$ | 2 | 4 | 2 | 4 | 25 | Stable (>6 d) |
| $Fe^{3+}$ | 2 | 6 | 2 | 6 | 25 | Stable (>6 d) |

One embodiment of a multiple electron RFB system includes a hybrid Fe/V RFB battery. The hybrid Fe/V RFB can comprise both $Fe^{2+/3+}$ and $V^{4+/5+}$ redox couples in positive electrolyte and $V^{2+/3+}$ redox couple and $Fe^{2+}$ in negative electrolyte. The electrolyte of a mixed solution comprising 1.5M $Fe^{2+}$, 1.5M $V^{4+}$, 1.5M $SO_4^{2-}$, and 3.8M $Cl^-$, hereafter denoted as 1.5Fe/V-3.8HCl, was prepared by dissolving $VOSO_4$ (Sigma-Aldrich, 99%) and $FeCl_2$ (Sigma-Aldrich, 98%) in concentrated HCl (Sigma-Aldrich, 37%) at room temperature for the Fe/V redox flow battery test. Cyclic voltammetry (CV) was carried out in 1.5Fe/V-3.8HCl electrolyte to identify redox couples and electrochemical reversibility using Solartron 1287 potentiostat (Solartron Analytical, USA). A glassy carbon electrode (CHI instrument, USA) and Ag/AgCl electrode (CHI instrument, USA) were used as the working and reference electrode, while a platinum flag served as the counter electrode, respectively. Various scan rates were used during the test.

Cell performance was tested using a flow cell system, which comprised a single cell connected with two Pyrex glass beaker reservoirs through a peristaltic pump and tubing. In each half cell, graphite felt served as a porous electrode, which was settled in a groove on a non-porous graphite current collector plate with two inlet and outlet connections. The depth of the groove in the graphite plates was designed to maintain a 10% compression on the encapsulated graphite felt. The apparent area (i.e., the area in contact with the membrane) of the graphite felt was 10 cm² (2 cm×5 cm), which was oxidized in air at 400° C. for 6 hours prior to the test to improve the electrochemical activity and hydrophilicity. Before cell assembly, a sulfonated tetrafluoroethylene based fluoropolymer-copolymer (NAFION®) membrane was soaked in de-ionized water for more than 24 hours at ambient temperature.

The electrochemical performance of the hybrid Fe/V RFB was evaluated under a constant current method using a potentiostat/galvanostat. Each half cell reservoir consisted 1.5Fe-1.5V-3.8HCl mixed acid solution as both positive and negative electrolyte, which was circulating through the graphite felt electrode at a flow rate of 20 mLmin⁻¹. Each half cell reservoir was purged with nitrogen gas and then sealed preceding the electrochemical test to minimize the oxidation of the active species. The flow cell was cycled in the voltage window between 1.7V and 0.5V at a constant current density of 50 mAcm⁻².

Figure 11A:
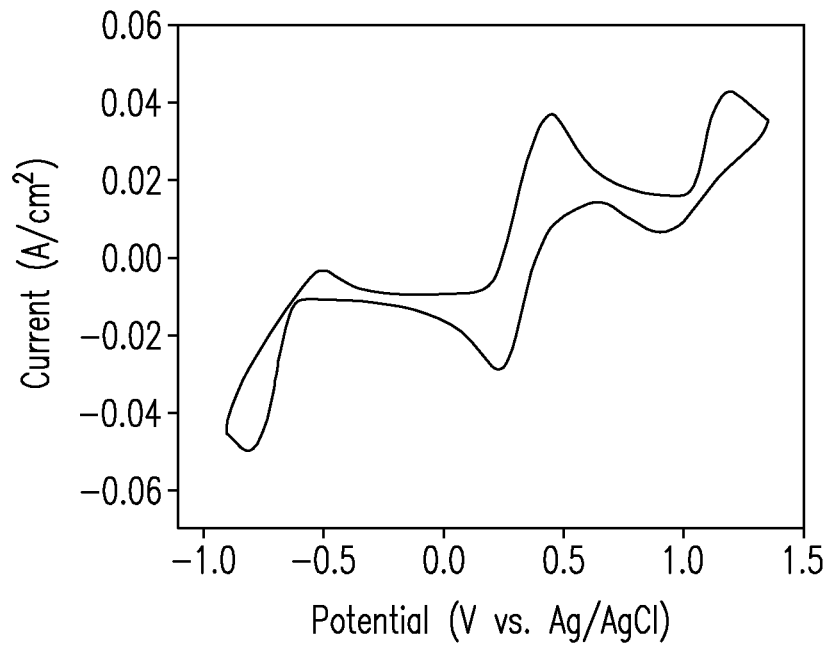
FIG. 11a-11d contains graphs showing the electrochemical performance of a hybrid Fe/V RFB system according to embodiments of the present invention.
Figure 11B:
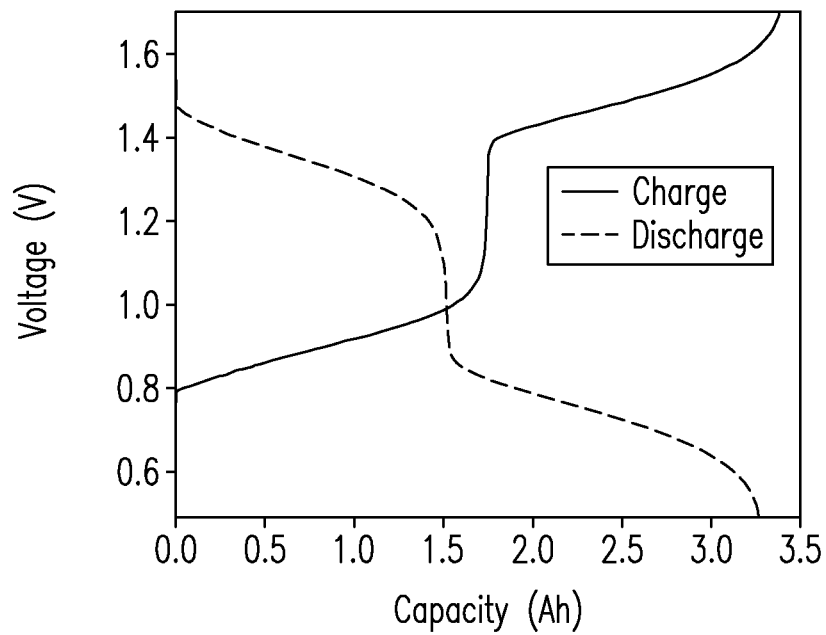
Figure 11C:
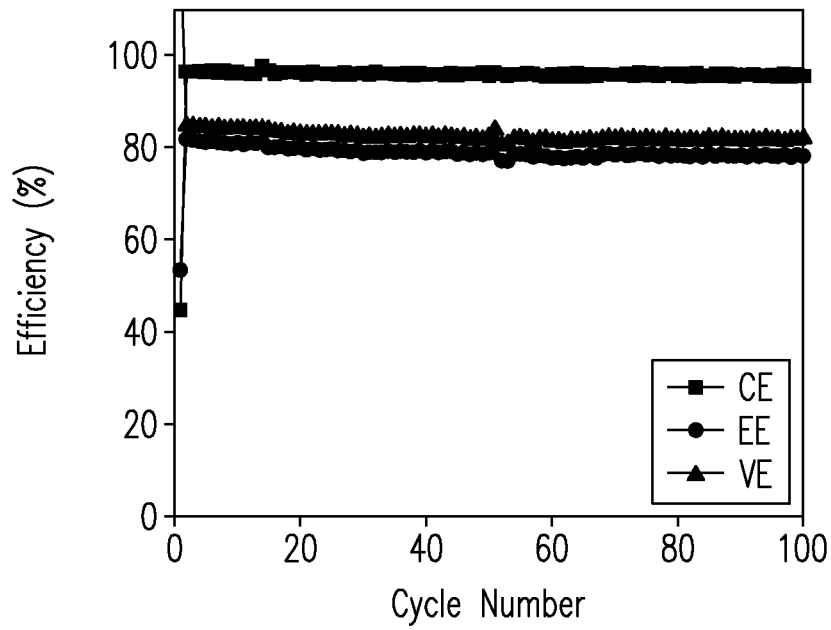
Figure 11D:
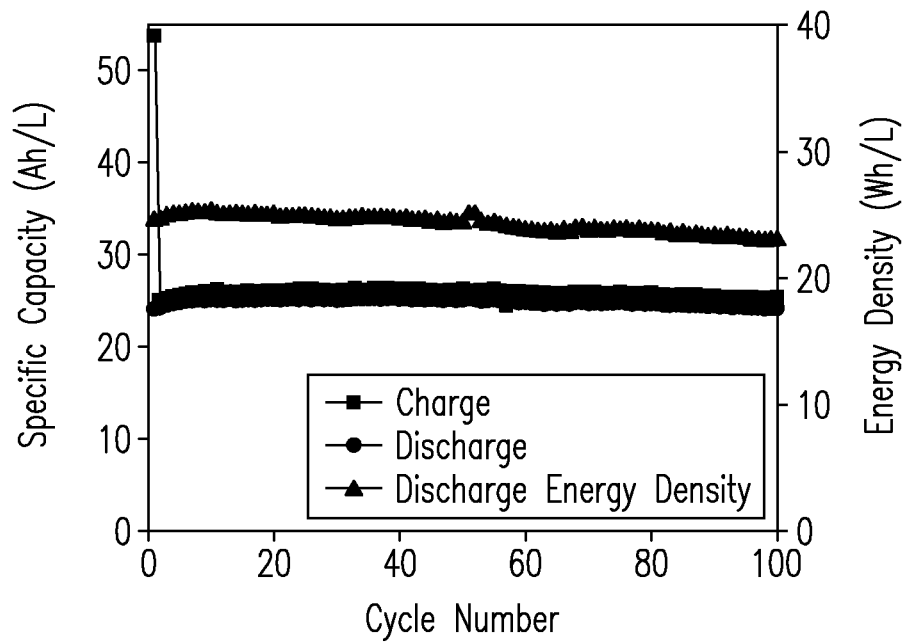

FIG. 11a-11d includes a cyclic Voltammetry (CV) spectrum (a) on glassy carbon electrode in the 1.5Fe/V-3.8HCl electrolyte at 10 mV/s scan rate as well as the electrochemical performance of a Fe/V mixed acid redox flow cell with 1.5Fe/V-3.8HCl electrolyte in each half-cell and NR212 as the membrane. FIG. 11b shows a Cell-voltage profile with respect to cell capacity during a typical charge/discharge process. FIG. 11c shows Cyclic Coulombic efficiency (CE), voltage efficiency (VE), and energy efficiency (EE) as a function of cycle number. FIG. 11d shows variation of specific volumetric capacity and discharge energy density with cycle number.

Referring to FIG. 11a, cyclic voltammogram (CV) was first performed on the 1.5Fe/V-3.8HCl electrolyte to investigate the available redox reactions and their reversibility and kinetics. The CV tests were carried out using glassy carbon electrodes at ambient temperature with the scan rate of 10 mVs⁻¹. The current density was normalized to the geometrical area of the working electrode. Corresponding to the previous reports of the V/V mixed acid and Fe/V system, a combination of multiple redox species ($V^{2+}/V^{3+}$, $Fe^{2+}/Fe^{3+}$, and $V^{4+}/V^{5+}$) were identified in FIG. 11a, which correspond to the following redox reactions of Eqns. 18-20.

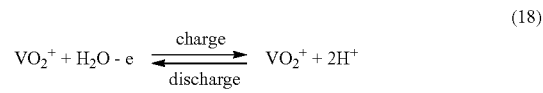
(18)

(19)

(20)

Due to lack of the additional redox couple in the cathode side, a double volume is therefore used for the negative electrolyte. The overall cell reaction can be written as Eq. 21.

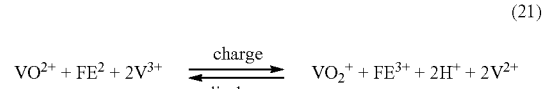
(21)

Based on the CV results of the $V^{4+}/V^{5+}$ vs. $V^{2+}/V^{3+}$ and $Fe^{2+}/Fe^{3+}$ vs. $V^{2+}/V^{3+}$ redox couples in the sulfate-chloride mixed acid electrolyte, a hybrid RFB system can be constructed with two similar equilibrium cell potentials with that of the V/V and Fe/V redox flow batteries.

The electrochemical cycling performance of the RFB system based on the $V^{4+}/V^{5+}$ vs. $V^{2+}/V^{3+}$ and $Fe^{2+}/Fe^{3+}$ vs. $V^{2+}/V^{3+}$ redox couples in the sulfate-chloride mixed acid electrolyte was tested with a lab made flow cell between the voltage window of 0.5~1.7 volts at 50 mAcm$^{-2}$ current density with a catalyst-coated NAFION® membrane (NR212) as described elsewhere herein. Corroborating with the CV scan results, two voltage plateaus were observed in a plot of the cell voltage profile with respect to the cell capacity (see FIG. 11b). The voltage plateau at ~0.9V during charge and at ~0.75V during discharge correspond to the $Fe^{2+}/Fe^{3+}$ vs. $V^{2+}/V^{3+}$ redox couple, while the voltage plateau at ~1.5V during charge and ~1.35V during discharge represent the $V^{4+}/V^{5+}$ vs. $V^{2+}/V^{3+}$ redox reaction. The voltage profile demonstrated by the Fe/V hybrid flow battery is in good agreement with the $Fe^{2+}/Fe^{3+}$ vs. $V^{2+}/V^{3+}$ redox reaction in Fe/V mixed acid flow cell described elsewhere herein and in the $V^{4+}/V^{5+}$ vs. $V^{2+}/V^{3+}$ redox reaction in the VRB with mixed acid.

FIG. 11c shows the efficiencies of the Fe/V hybrid cell with the sulfate-chloride mixed acid electrolyte up to 100 cycles, in which a columbic efficiency of ~96%, a voltage efficiency of ~83% were achieved leading to an overall energy efficiency of ~80%. The Fe/V hybrid flow battery also presented excellent capacity retention as shown in the FIG. 11d with no obvious capacity loss throughout the 100 cycles. The discharge energy density representing the ultimate capability of the cell to deliver the useful energy is also plotted in FIG. 11d, in which approximately 25 Wh/L of specific volumetric energy density was obtained over 100 cycles of electrochemical cycling. The calculation was based on the total electrolyte volume in both negative and positive half cells. Compared with the Fe/V cell using the sulfate-chloride mixed acid electrolyte, the Fe/V hybrid cell achieved a >60% increase in the specific volumetric energy density attributed to the contribution from the second redox reaction pair. The excellent electrochemical performance of the Fe/V hybrid cell is attributed to the improved energy density of a flow battery system by utilizing multiple electron transfer as discussed previously.

Figure 12A:
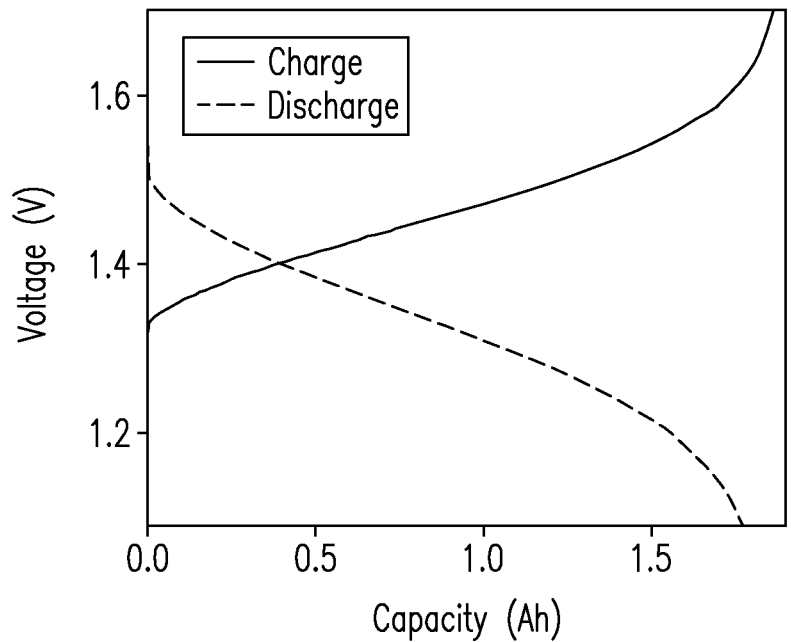
FIG. 12a-12c contains graphs showing cycling performance of a hybrid Fe/V RFB system in the voltage window of 1.1~1.7V.
Figure 12B:
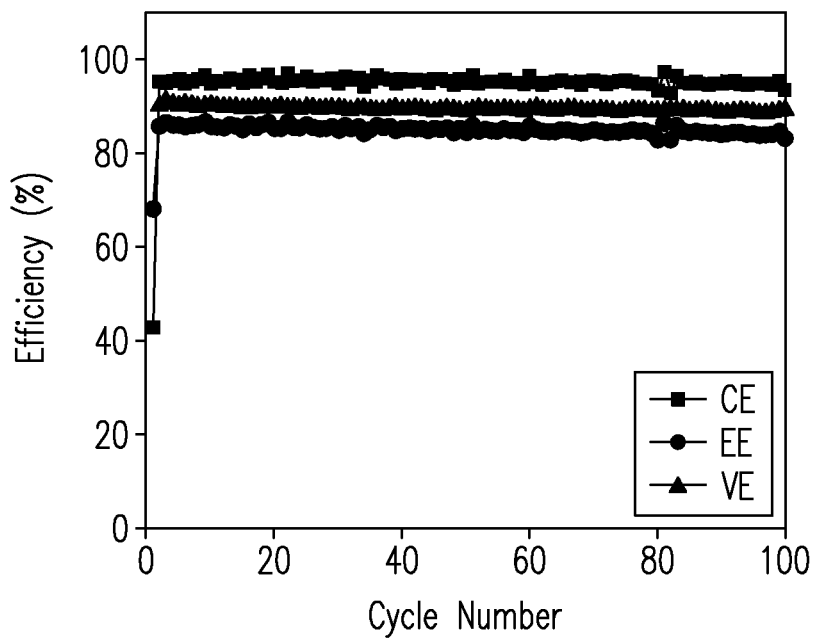
Figure 12C:
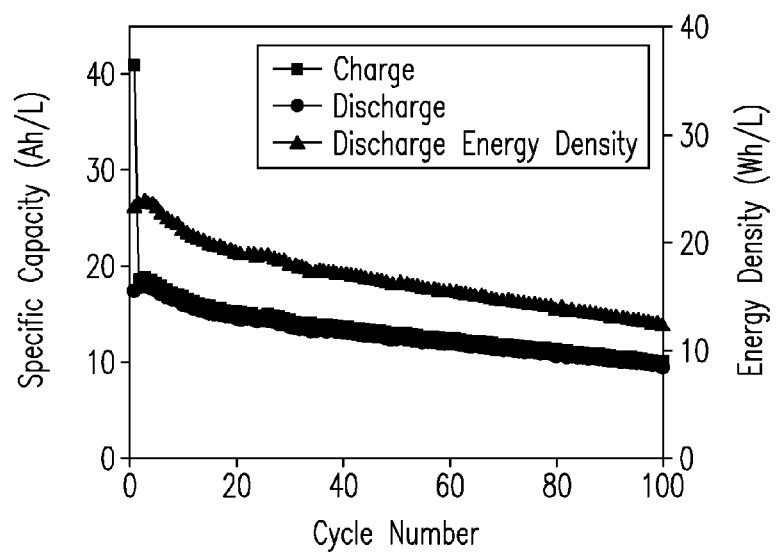

For comparison purposes, the cell and electrolyte described above were tested with the cell voltage window limited between 1.1~1.7V. In this window, only the $V^{4+}/V^{5+}$ vs. $V^{2+}/V^{3+}$ redox couple is utilized in the cell charge/discharge cycling as shown in FIG. 12a-12c. In FIG. 12a, the voltage plateau at ~1.5V during charge and ~1.35V during discharge represent the $V^{4+}/V^{5+}$ vs. $V^{2+}/V^{3+}$ redox reaction. Although a stable energy efficiency of ~85% is achieved over 100 cycles (see FIG. 12b), cell capacity as well as the energy density demonstrated fast decay over the continuous cycling as shown in the FIG. 12c. In the first 5 cycles, the flow cell achieved an average energy density of ~23 Wh/L. It is well known that the VRB system often suffered from substantial capacity loss due to several contributing factors, such as hydrogen evolution, air oxidation of V(II), and the different diffusion rates of the vanadium ions across the membrane, all disturbing the SOC balance between the two half cells causing significant capacity decay. Unexpectedly, by adding an extra redox couple into the cell reaction, the Fe/V hybrid flow battery not only attained a relatively higher energy density, but also accomplished stable capacity over extended cycling which enables the system to operate with minimal electrolyte maintenance. It is worth noting that the capacity retention capability of a hybrid redox flow battery can be significantly impacted by alternating the available active redox couples.

The electrochemical cycling performance of a Fe/V flow battery utilizing only $Fe^{2+}/Fe^{3+}$ vs. $V^{2+}/V^{3+}$ redox couple is described elsewhere herein. Stable electrochemical cycling performance was successfully demonstrated over 100 cycles with the energy density of ~15 Wh/L. The comparatively low energy density, relative to the hybrid Fe/V flow battery, is due to an intrinsically lower cell voltage. Incorporation of the $V^{4+}/V^{5+}$ vs. $V^{2+}/V^{3+}$ redox couple into the Fe/V flow battery system significantly increases the operational voltage of the system leading to a much improved system energy density, while exhibiting excellent capacity retention capability from the Fe/V system demonstrating hundred cycles of stable cycling without noticeable capacity fading. Consequently, the fuel utilization ratio in a Fe/V hybrid flow battery system is much higher than even the Fe/V RFB by exploiting the $V^{4+}/V^{5+}$ vs. $V^{2+}/V^{3+}$ redox couple.

Despite the continuous development of the VRB system, the high cost is still a hurdle preventing the VRB system from a broader market penetration. Among the different components of the VRB system, the vanadium electrolyte can count for ~35% of the system capital cost mainly due to the high and volatile price of the vanadium resource. From a cost perspective, it can therefore be important to compare the different redox flow batteries in terms of the energy performance per unit vanadium source consumed. The energy densities per mole of vanadium of the different vanadium related redox flow battery systems are thus listed in the Table 8.

TABLE 8

Energy density per mole of vanadium of the different vanadium related redox flow batteries at the current density of 50 mA/cm$^2$.[22, 25]

|  | VRB | Gen 3 VRB | Fe/V | Fe/V hybrid |
| --- | --- | --- | --- | --- |
| Electrolyte composition | 1.6V—4.5S | 2.5V—6Cl | 1.5Fe—1.5V—3.8Cl | 1.5Fe—1.5V—3.8Cl |
| Energy Density per vanadium (Wh · L$^{-1}$ · M$^{-1}$) | 14.1 | 15.4 | 10 | 16.7 |

The Fe/V hybrid flow battery system achieves the highest value representing the most effective use of the vanadium source among the different systems, which is originated from the successful substitution of the $V^{4+}/V^{5+}$ with the low-cost $Fe^{2+}/Fe^{3+}$.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A battery comprising:
   a redox flow battery (RFB) system having an aqueous-based negative electrolyte, an aqueous-based positive electrolyte, and a membrane between the negative electrolyte and the positive electrolyte, the system further comprising:
   at least two electrochemically active elements in the negative electrolyte, the positive electrolyte, or both, thereby employing at least two electrochemically active redox pairs, the at least two electrochemically active redox pairs being present in the RFB negative half cell, positive half cell, or both, during both charging and discharging of the RFB system, wherein the positive electrolyte comprises electrochemically active redox pair ions consisting of electrochemically active V redox ions and electrochemically active Fe redox ions.

2. The system of claim 1, wherein the volume of the negative electrolyte is approximately twice that of the positive electrolyte.

3. The system of claim 1, wherein the negative electrolyte and the positive electrolyte further comprise chloride.

4. The system of claim 1, wherein the negative electrolyte and the positive electrolyte further comprise sulfate.

5. The system of claim 1, wherein the negative electrolyte and the positive electrolyte further comprise chloride and sulfate.

6. The system of claim 5, wherein the chloride to sulfate concentration ratio is between 1:10 and 10:1.

7. The system of claim 5, wherein the chloride to sulfate concentration ratio is between 1:3 and 3:1.

8. The system of claim 1, wherein negative electrolyte comprises $V^{2+}$ and $V^{3+}$ with total concentrations of $V^{2+}$ and $V^{3+}$ greater than 1M.

9. The system of claim 1, wherein positive electrolyte total concentrations of $V^{4+}$ and $V^{5+}$ are greater than 1M.

10. The system of claim 1, wherein positive electrolyte total concentrations of $Fe^{2+}$ and $Fe^{3+}$ are greater than 1M.

11. The system of claim 1, wherein the negative electrolyte comprises Zn.

12. The system of claim 1, having a cell temperature less than 60° C. during operation.

13. The system of claim 1, having a cell temperature between −20° C. and 50° C. during operation.

14. A redox flow battery (RFB) system having:
   a membrane separating an aqueous-based negative electrolyte and an aqueous-based positive electrolyte, the positive electrolyte comprises electrochemically active redox pair ions $V^{4+}$ and $V^{5+}$ as well as electrochemically active redox pair ions $Fe^{2+}$ and $Fe^{3+}$, the negative electrolyte comprises electrochemically active redox pair ions consisting of electrochemically active redox pair ions $V^{2+}$ and $V^{3+}$;
   an operational voltage window having a lower limit not greater than 0.6 V and an upper limit not less than 1.5 V; and
   a volume of the negative electrolyte that is approximately twice that of the positive electrolyte, the RFB system thereby employing at least two electrochemically active redox pairs in the RFB positive half cell during charging and discharging of the RFB system.

15. The RFB system of claim 14, wherein the negative electrolyte and the positive electrolyte further comprise a mixture of chloride and sulfate.

* * * * *